US008814795B2

(12) United States Patent
Derode et al.

(10) Patent No.: US 8,814,795 B2
(45) Date of Patent: Aug. 26, 2014

(54) SOUNDING METHOD AND DEVICE USING WAVE PROPAGATION

(75) Inventors: Arnaud Derode, Paris (FR); Alexandre Aubry, Villiers Charlemagne (FR); Mathias Fink, Meudon (FR)

(73) Assignee: Centre National de la Recherche Scientifique —CNRS—, Paris Cedex (FR)

( * ) Notice: Subject to any disclaimer, the term of this patent is extended or adjusted under 35 U.S.C. 154(b) by 560 days.

(21) Appl. No.: 12/997,010

(22) PCT Filed: Jun. 8, 2009

(86) PCT No.: PCT/FR2009/051080
§ 371 (c)(1),
(2), (4) Date: Jan. 28, 2011

(87) PCT Pub. No.: WO2010/001027
PCT Pub. Date: Jan. 7, 2010

(65) Prior Publication Data
US 2011/0125014 A1    May 26, 2011

(30) Foreign Application Priority Data
Jun. 9, 2008    (FR) .................................... 08 53821

(51) Int. Cl.
*A61B 8/00*    (2006.01)
(52) U.S. Cl.
USPC ........................................ 600/437; 600/407
(58) Field of Classification Search
USPC ................................................ 600/437, 407
See application file for complete search history.

(56) References Cited

U.S. PATENT DOCUMENTS

| | | | | |
|---|---|---|---|---|
| 3,540,287 A | * | 11/1970 | Maidanik et al. ................ | 73/703 |
| 8,002,705 B1 | * | 8/2011 | Napolitano et al. ........... | 600/437 |
| 2006/0064012 A1 | * | 3/2006 | Waag et al. .................... | 600/437 |
| 2006/0187754 A1 | | 8/2006 | Fink et al. | |
| 2008/0004527 A1 | * | 1/2008 | Coleman et al. .............. | 600/437 |
| 2010/0142781 A1 | * | 6/2010 | Walker et al. ................. | 382/131 |

FOREIGN PATENT DOCUMENTS

WO    WO-2004/058071 A1    7/2004
WO    WO-2004/086557 A1    10/2004

OTHER PUBLICATIONS

Ralph O. Schmidt; "Multiple Emitter Location and Signal Parameter Estimation"; magazine; Mar. 1986; p. 276-280; vol. AP-34, No. 3; Air Force Base, NY.
Claire Prade, Michael Tanter and Mathias Fink; "Flaw Detection in Solid With the D.O.R.T. Method"; magazine; 1997; p. 679-683; 1997 IEEE Ultrasonics Symposium;.

(Continued)

*Primary Examiner* — Tse Chen
*Assistant Examiner* — Vani Gupta
(74) *Attorney, Agent, or Firm* — Miller, Matthias & Hull LLP

(57) ABSTRACT

The invention relates to a wave-propagation-based sounding method, in which: an incident wave is emitted through a medium including diffusers capable of reflecting the wave; and, subsequently, signals representing a reflected wave reverberated by the medium from the incident wave are captured, said captured signals being the sum of a single scattering component and a multiple scattering component. The captured signals are processed by separating the multiple scattering component from the single scattering component by filtering at least one frequency transfer matrix representing responses between transducers from the transducer assembly.

21 Claims, 8 Drawing Sheets

(56) References Cited

OTHER PUBLICATIONS

A. M. Sengupta and P. P. Mitra; "Distributions of Singular Values for Some Random Matrices"; magazine; Sep. 1999; p. 3389-3392; vol. 60, No. 3; Bell Laboratories, Lucent Technologies, New Jersey.

Margaret Cheney and Robert J. Bonneau; "Imaging That Exploits Multipath Scattering from Point Scatterers"; magazine; 2004; p. 1691-1711; Department of Mathematical Sciences, Rensselaer Polytechnic Institute, NY.

Robert J. Bonneau; "a Waveform Strategy for Detection of Targets in Multiplicative Clutter"; magazine; 2006; p. 84-93; Air Force Research Laboratory; NY.

Arnaud Derode and Victor Mamou; "Dynamic Coherent Backscattering in a Heterogeneous Absorbing Medium: Application to Human Trabecular Bone characterization"; magazine; Sep. 2005; Paris France.

J. M. Bordier, M. Fink; "The Influence of Multiple Scattering in Incoherent Ultrasonic Inspection of Coarse Grain Stainless Steel"; magazine; 1991; p. 803-808; Paris France.

Gruber, et al.; "Time-Reversal-Based Imaging and Inverse Scattering of Multiply Scattering Point Targets"; magazine; Aug. 2005; p. 3129-3138;vol. 118, No. 5; Acoustical Society of America.

Robert, et al; "Time Reversal operator Decomposition With Focused Transmission and Robustness to Speckle Noise: Application to Microcalcification Detection"; magazine; Mar. 2006; p. 3848-3859;vol. 119, No. 6; Acoustical Society of America.

Larose, et al.; "Weak Localization of Seismic Waves"; magazine; Jul. 2004; vol. 93, No. 4; The American Physical Society.

Nelson, et al.; "Sources and Impact of Artifacts on clinical Three-Dimensional Ultrasound Imaging"; magazine; Jun. 2000; p. 374-383; Ultrasound n Obstetrics and Gynecology.

J. C. J. Paasschens; "Solution of the Time-Dependent Boltzmann Equation"; magazine; Mar. 1997; p. 1135-1141; vol. 56, No. 1; The American Physical Society.

Borcea, et al.; "Adaptive Interferometric Imaging in Clutter and Optimal Illumination"; 2006; magazine; p. 1405-1436; IOP Publishing Ltd.

Prada, et al.; Eigenmodes of the Time Reversal Operator: A Solution to Selective Focusing in Multiple-Target Media; magazine; Apr. 1994; p. 151-163; Elsevier Science B.V.

French Search Report for priority application No. FR 08 53821; Report dated Apr. 28, 2009.

* cited by examiner

US 8,814,795 B2

SOUNDING METHOD AND DEVICE USING WAVE PROPAGATION

CROSS-REFERENCE TO RELATED APPLICATIONS

This application is a U.S. national stage filing under 35 USC §371 of International Patent Application No. PCT/FR2009/051080 filed on filed on Jun. 8, 2009, which claims priority under the Paris Convention to the French Patent Application No. 08 53821, filed on Jun. 9, 2008.

FIELD OF THE DISCLOSURE

The present invention relates to wave-propagation probing methods and devices.

BACKGROUND OF THE DISCLOSURE

More particularly, the invention relates to a wave-propagation probing method, said method comprising:
  (a) a transmission step during which a transducer array (that is to say all or some of the transducers of the array) transmits an incident wave into a medium that scatters said wave;
  (b) a measurement step during which said transducer array (that is to say all or some of the transducers of the array) captures signals representative of a reflected wave reverberated by the medium on the basis of the incident wave, said captured signals comprising:
    a single scattering component representative of wave paths in which the reflected wave results from a single reflection of the incident wave by scatterers belonging to the medium, and
    as the case may be, a multiple scattering component representative of wave paths in which the reflected wave results from several successive reflections of the incident wave by the scatterers in the medium before reaching the transducer array; and
  (c) a processing step during which said captured signals are processed so as to determine characteristics of the medium (the characteristics in question may consist of an image of the medium and/or a value of a parameter of the medium and/or the presence or absence of a singular point, such as a heterogeneity, etc.).

The abovementioned processing step makes it possible, for example, to measure a characteristic parameter of the medium and/or to detect a singular point in the medium and/or to produce an image of the medium.

Methods of this type are used especially in detection and imaging systems such as, for example, sonars, radars, echographs, etc.

In the known methods of this type and especially in echographic or radar imaging methods, the single scattering component of the captured signals is used: if each scatterer interacts only once with the wave, there is in fact a direct equivalence between the arrival time of each echo and the distance separating the transducer from the scatterer that has generated this echo. The detection of an echo at a given instant indicates the presence of a scatterer at the distance corresponding to the echo arrival time. An image of the reflectivity of the medium, that is to say an image of the position of the various scatterers within the medium, may, as the case may be, then be constructed from the captured signals.

In contrast, multiple scattering is not used in echographic or radar imaging methods. Quite on the contrary, these imaging methods are based on the assumption that said multiple scattering is negligible. However, in the presence of a substantial multiple scattering component, especially when the scatterers contained in the medium have a high scattering power and/or are very dense within the medium, the conventional imaging methods are highly disturbed and no longer reliable. This is because, in such a case, there is no longer equivalence between the arrival time of an echo and the distance separating a transducer from a scatterer in the medium, thereby preventing an image of the medium from being constructed.

SUMMARY OF THE DISCLOSURE

The object of the present invention is especially to improve the probing methods as defined above, so as to take into account the multiple scattering component.

For this purpose, according to the invention, during the processing step, at least one component chosen from the multiple scattering component and the single scattering component is extracted, by filtering at least one frequency transfer matrix representative of the responses between transducers of the transducer array.

This separation may be put to good use, for example:
  for using only the single scattering component to construct an image of the medium;
  or else for determining a characteristic parameter of the medium from the multiple scattering component, etc.

It should be noted that the invention is applicable when the captured signals do not actually contain a multiple scattering component: the invention then makes it possible to determine that the multiple scattering is zero, thereby providing a useful indication for characterizing the medium probed. In addition, even in the absence of a significant contribution from multiple scattering, the invention makes it possible to eliminate most of the noise and the aberration effects in the captured signals when the contribution from single scattering is extracted, something which may prove to be extremely useful.

In various ways of implementing the method according to the invention, one or more of the following arrangements may optionally be furthermore employed:
  the multiple scattering component is non-zero;
  during the processing step (c), the single scattering component is extracted and said single scattering component is used to detect (and generally locate) at least one singular point in the medium;
  during the processing step (c), an image of the medium is produced on the basis of said single scattering component;
  during the processing step (c), said single scattering component in the form of a filtered temporal inter-element response matrix $H^F$, representative of the responses between transducers of the transducer array, is determined and the image of the medium is produced by path formation on the basis of said filtered temporal inter-element response matrix $H^F$;
  during the processing step (c), said single scattering component in the form of at least one filtered frequency transfer matrix $K^F$, representative of the responses between transducers of the transducer array, is determined and the image of the medium is produced by the method of decomposing the time reversal operator $K^{F*} \cdot K^F$, in which $K^{F*}$ is the complex conjugate matrix of said filtered frequency transfer matrix $K^F$;
  during the processing step (c), the multiple scattering component is extracted and a reliability index representative of the magnitude of the single scattering in the medium is calculated from said multiple scattering component;

during the processing step (c), an image of the medium is formed and the reliability of said image is quantified as a function of said reliability index;

during the processing step (c), said reliability index is calculated at several points and the reliability of several parts of the image corresponding to said several points is quantified as a function of said reliability index;

during the processing step (c), the multiple scattering component is separated from the single scattering component by filtering at least one frequency transfer matrix representative of the responses between transducers of the transducer array;

the processing step (c) comprises at least the following substeps:
(c1) a windowed transfer matrix determination substep during which at least one windowed frequency transfer matrix $K(T,f)=[k_{ij}(T,f)]$, corresponding to a windowed temporal inter-element response matrix $K(T,t)=[k_{ij}(T,t)]$, is determined, said windowed temporal inter-element response matrix corresponding, over a neighboring temporal window of time T and duration $\Delta t$, to the temporal responses $h_{ij}(t)$ between transducers of the transducer array, f being the frequency and (c3) a filtering substep during which the multiple scattering component is separated from the single scattering component in each windowed frequency transfer matrix $K(T,f)$ as a function of the coherence of the coefficients $k_{ij}(T,f)$ of the windowed frequency transfer matrix $K(T,f)$ along each antidiagonal of said windowed frequency transfer matrix $K(T,f)$;

during the filtering substep (c3), a single scattering component $k^s_{ij}(T,f)$ is extracted from each coefficient $k_{ij}(T,f)$ of the matrix $K(T,f)$, such that the single scattering components $k^s_{ij}(T,f)$ are mutually coherent along each antidiagonal of said matrix $K(T,f)$;

during the filtering substep (c3), a multiple scattering component $k^M_{ij}(T,f)$ is extracted from each coefficient $k_{ij}(T,f)$ of the matrix $K(T,f)$ (this component is such that said multiple scattering components $k^M_{ij}(T,f)$ are random);

the transducer array comprises at least a number N of transducers and the windowed frequency transfer matrix $K(T,f)$ is an N×N matrix;

during the windowed transfer matrix determination substep (c1), several windowed transfer matrices $K(T,f)$ are determined for several values of T and the procedure passes to the filtering substep (c3) for each of the windowed transfer matrices $K(T,f)$;

the temporal windows of the various windowed transfer matrices $K(T,f)$ are contiguous (said temporal windows may either be adjacent or mutually overlapping);

during the windowed transfer matrix determination substep (c1), each windowed frequency matrix $K(T,f)$ is determined by the Fourier transform of a windowed temporal matrix $K(T,t)$ corresponding, over said neighboring temporal window of time T and duration $\Delta t$, to the temporal responses $h_{ij}(t)$ between transducers of the transducer array;

in the method:
the processing step (c) further includes a data rotation substep (c2) which is intermediate between the windowed transfer matrix determination substep (c1) and the filtering substep (c3) and during which two matrices $A1(T,f)=[a1_{uv}(T,f)]$ and $A2=[a2_{uv}(T,f)]$ are calculated from $K(T,f)$, in which:
$a1_{uv}(T,f)=k_{u+v-1,v-u+2M-1}(T,f)$
$a2_{uv}(T,f)=k_{u+v,v-u+2M-1}(T,f)$
$M=(N+3)/4$, N is a smaller dimension of the transfer matrix $K(T,f)$ and is chosen so that M is an integer, during the filtering substep (c3), the multiple scattering component is separated from the single scattering component in each of the matrices Ar, r being an index equal to 1 or 2, and at least two filtered matrices $Ar^F$ are thus obtained which correspond, respectively, to the matrices Ar and each being representative either of the single scattering component or of the multiple scattering component, and the processing step (c) furthermore includes an inverse data rotation substep (c4) which is after the filtering substep (c3) and during which a filtered windowed transfer matrix $K^F(T,f)=[k^F_{ij}(T,f)]$ is calculated, where:
when i−j is even: $k^F_{ij}(T,f)=a1^F_{(i-j)/2+M,(i+j)/2}$,
when i−j is odd: $k^F_{ij}(T,f)=a2^F_{(i-j-1)/2+M,(i+j-1)/2}$;

during the filtering substep (c3), the two matrices $Ar^F$ are calculated by the formula: $Ar^F = {}^tS'S*Ar$, in which:
$S=[s_u]$ is a column vector, ${}^tS*$ being the transpose of the conjugate vector of the vector S;
the components $s_u$ of the vector S are complex numbers equal to:

$$s_u = \exp\left\{j\frac{k}{2R}y_u^2\right\}/\sqrt{L};$$

k is the wavenumber;
$R=c\cdot T/2$;
$y_u=(x_i-x_j)/\sqrt{2}$, with $u=(i-j)/2+M$ if $r=1$ and $u(i-j-1)/2+M$ if $r=2$;
$x_i$ and $x_j$ are the abscissae of the transducers of indices i and j along an axis X, the transducer array extending at least along said axis X; and
$L=2M-1$ for $r=1$ and $L=2M-2$ for $r=2$,
said matrices $Ar^F$ being representative of the single scattering component;

during the filtering substep (c3):
each of the matrices Ar is decomposed into singular values, thus determining M singular values $\lambda_{i,r}$ for each of the matrices Ar, i being an index between 1 and M and the singular values being ordered in decreasing order for increasing i; and for each matrix Ar, the most important p singular values $\lambda_{1,r}$ to $\lambda_{p,r}$, p being between 1 and M, are assigned to the single scattering and the other possible non-zero singular values are assigned to the multiple scattering;

the p singular values assigned to the single scattering are determined iteratively as follows:
(c31) q is initially set to 1;
(c32) a normalized singular value is calculated from $$\lambda_{q,r}; \tilde{\lambda}_{q,r} = \frac{\lambda_{q,r}}{\sqrt{\frac{1}{Mr+1-q}\sum_{m=q}^{Mr}\tilde{\lambda}_{m,r}^2}},$$

with $Mr=M$ if $r=1$ and $Mr=M-1$ if $r=2$;
(c33) if $\tilde{\lambda}_{q,r}$ is at least equal to a predetermined threshold value $\tilde{\lambda}_{max}$, $\tilde{\lambda}_{q,r}$ is assigned to the single scattering and substep (c32) is repeated, q being incremented by unity; and
(c34) if $\tilde{\lambda}_{q,r}$ is below the threshold value $\tilde{\lambda}_{max}$, then $\tilde{\lambda}_{q,r}$ and the possible following singular values are assigned to the multiple scattering; and said waves are chosen from mechanical waves and electromagnetic waves.

Moreover, the subject of the invention is also a device for implementing a probing method as defined above, comprising an array of transducers designed to transmit an incident wave into a scattering medium and to capture signals representative of a reflected wave reverberated by the medium on the basis of the incident wave, said captured signals comprising:

a single scattering component representative of wave paths in which the reflected wave results from a single reflection of the incident wave by each scatterer in the medium; and as the case may be, a multiple scattering component representative of wave paths in which the reflected wave results from several successive reflections of the incident wave by the scatterers in the medium before reaching the transducer array, said device furthermore including processing means designed to process said captured signals for the purpose of determining characteristics of the medium, characterized in that the processing means are designed to extract at least one component chosen from the multiple scattering component and the single scattering component, by filtering at least one frequency transfer matrix representative of the responses between transducers of the transducer array.

BRIEF DESCRIPTION OF THE DRAWINGS

Other features and advantages of the invention will become apparent over the course of the following description of several of its embodiments, given as nonlimiting examples, in conjunction with the appended drawings.

In the drawings.

DETAILED DESCRIPTION OF THE DISCLOSURE

Figure 1:
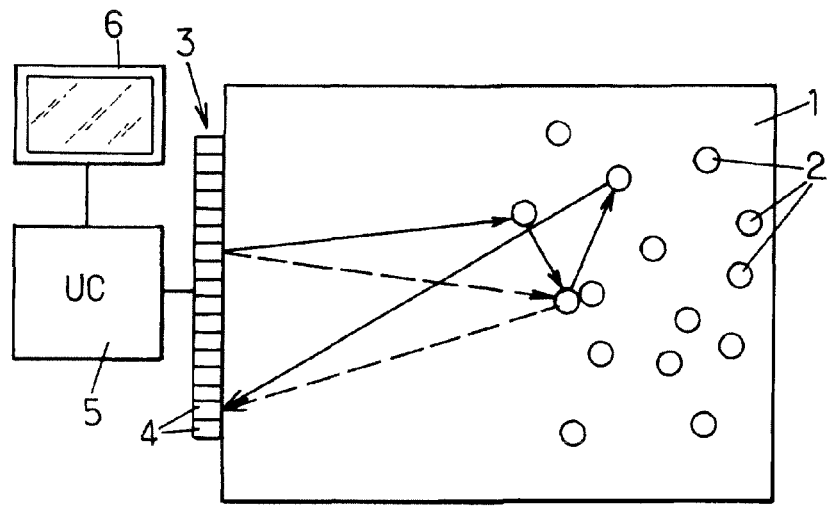
FIG. 1 is a schematic view of a device for implementing a method according to one embodiment of the invention.

FIG. 1 shows an example of a device designed for probing a medium 1 by wave transmission/reception. The invention will be more particularly described below in the case in which the waves in question are ultrasonic waves (for example with a frequency between 2 and 4 MHz), but the invention is also applicable to waves of any nature, for example mechanical waves other than ultrasonic compressional waves, electromagnetic waves, or the like.

The medium 1 is scattering for the waves in question, that is to say it is heterogeneous and/or contains randomly distributed scatterers 2 capable of reflecting the waves transmitted into the medium 1.

The medium 1 in question may for example be part of the human body, and the scatterers 2 may especially be small, unresolved, particles contained in the medium 1 (in echography, such scatterers generate what are called "speckle" images). Of course, the medium 1 to be probed could be some other medium, for example part of an industrial object the structure of which it is desired to check in the context of nondestructive testing.

The probing device shown in FIG. 1 comprises an array 3 of transducers 4, for example a linear array of ultrasonic transducers that conventionally take the form of a rigid linear array placed in contact with the medium 1. This array 3 comprises N transducers, N possibly being for example between 100 and 500. For example, it is possible to use a linear array of around one hundred transducers 4 each having a width of about 0.39 mm in width. It should be noted that the transducers 4 here are ultrasonic transducers capable of converting an electrical signal into ultrasonic compressional waves, or vice versa, but in the context of the present patent, a transducer will more generally refer to any device capable of converting an electrical signal into a wave of any nature whatsoever (mechanical wave, electromagnetic wave, etc.) and vice versa.

Each transducer 4 of the array 3 may be individually controlled by a central processing unit (CPU) 5 comprising for example digital signal processing means means, it being possible for this central processing unit 5 to be designed for example to display an image of the medium 1 on a screen 6.

To probe the medium 1, the central processing unit 5 sends electrical signals to the transducers 4, which are converted by said transducers into waves transmitted into the medium 1, in this case ultrasonic compressional waves, and these waves are partially reflected by the scatterers 2 contained in the medium. Some of the scattered waves (or echoes) thus return to the transducers 4, which capture them and convert them to electrical receive signals which are then processed by the central processing unit 5.

These waves return to the transducers 4:
- either after having been reflected only once by the scatterers 2 (for example along the path shown by the dotted lines in FIG. 1), i.e. after having undergone a single scattering event;
- or after having been reflected in succession from several scatterers 2 (for example along the path shown schematically by the solid lines in FIG. 1), i.e. after having undergone multiple scattering events.

The total wave scattered by the medium 1 and returned to the transducers 4 therefore has two contributions:
- a "single scattering" contribution corresponding to the cases in which the incident wave undergoes only a single reflection by each scatterer 2 in the medium 1 before returning to the transducers 4; and
- a "multiple scattering" contribution corresponding to the cases in which the incident wave undergoes several successive reflections by the scatterers 2 in the medium before reaching the transducers 4.

The present invention makes it possible to separate these two contributions by filtering, so as to use only one of them or to process them separately. For example:
- the single scattering contribution is useful for constructing an image of the medium, especially by echography in the case described here (but it could also be a seismographic image in the case of seismic waves, or a radar image in the case of electromagnetic waves, or the like): in fact, since each scatterer 2 interacts only once with the incident wave, there is a direct equivalence between the arrival time of each echo and the distance separating the sensor from the scatterer that has generated this echo. Detecting an echo signal at a given instant indicates the presence of a scatterer 2 at the distance corresponding to the echo arrival time. An image of the reflectivity of the medium, i.e. the position of the various scattering targets within the medium, may therefore be constructed from the recorded signals; and
- the multiple scattering contribution may also be useful for the purpose of characterizing a disordered medium, as it makes it possible to measure statistical parameters such as the mean free path or the scattering coefficient of a wave propagating through a random medium; the relative importance of this multiple scattering contribution also makes it possible to characterize the reliability of an image of the medium 1 obtained for example by echography.

To separate the single scattering contribution from the multiple scattering contribution, the inter-element responses of each pair of transducers 4 of the array 3 are firstly recorded.

Figure 2:
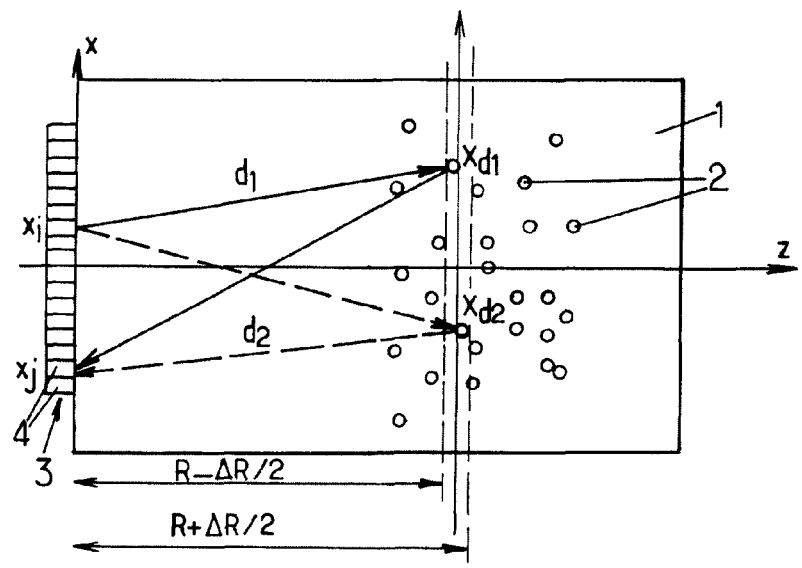
FIG. 2 is a diagram representing two single scattering fields contributing to the field backscattered by the probed medium at time T=2R/c in the example of FIG. 1.

For this purpose, as shown in FIG. 2, an incident wave corresponding to a pulsed signal is sent from each ith transducer of the array 3 (of abscissa $x_i$) during a transmission step (a) and the wave backscattered (reverberated) by the medium after transmission of this incident wave is recorded by each jth transducer (of abscissa $x_j$) during a measurement step (b). During this operation, each transducer j captures a temporal signal $h_{ij}(t)$ after a transmission by the transducer i. This operation is carried out for all the possible transmitter/receiver pairs of the array 3, i.e. in practice for all the pairs of transducers 4.

The set of $N^2$ responses forms a temporal inter-element response matrix $H(t)=[h_{ij}(t)]$, an N×N square matrix, which is the overall response of the medium 1. It should be noted that the temporal inter-element response matrix $H(t)$ may possibly be acquired more rapidly, without a pulsed signal being transmitted in succession by each transducer 1 of the array 3, by carrying out the procedure as taught for example in document WO-A-2004/086557.

The signals $h_{ij}(t)$ are digitized (for example over 9 bits, or the like), sampled (for example by sampling at 20 MHz in the case of ultrasonic waves) and recorded by the central processing unit 5.

The central processing unit 5 then carries out a processing step (c), comprising an initial windowed transfer matrix determination substep (c1).

During this substep (c1), each pulsed response $h_{ij}(t)$ is firstly truncated (windowed) into successive time windows of duration $\Delta t$.

A series of windowed temporal matrices $K(T,t)=[k_{ij}(T,t)]$ of size N×N is thus obtained, in which $k_{ij}(T,t)$ is the contribution to $h_{ij}(t)$ corresponding to the time window $[T-\Delta t/2; T+\Delta t/2]$, i.e.:

$$k_{ij}(T,t)=h_{ij}(t) \times W_R(t-T) \quad (1)$$

with:
- $w_R(t)=1$ for $t \in [-\Delta t/2; +\Delta t/2]$ and $W_R(t)=0$ everywhere else;
- $R=c \cdot T/2$ is a distance measured from the transducer array 3 (see FIG. 2) along an axis z perpendicular to the longitudinal direction x of said transducer array (constituting a linear array in the example considered here);
- where c is the velocity of the wave in the medium 1 (i.e. in the particular case of ultrasound in water or in soft tissue of the human body, $c=1.5$ mm/µs); and
- $\Delta t$ is a predetermined duration corresponding to a distance $\Delta R=c \cdot \Delta t$ traveled by the wave, it being advantageously possible for the abovementioned time intervals $[T-\Delta t/2; T+\Delta t/2]$ to be contiguous, that is to say for them to completely cover a defined time period (in other words, the treatment carried out covers a depth of field, i.e. a range of R values which is also continuous).

During the substep (c1), a discrete Fourier transform of the coefficients of the matrix $K(T,t)$ is then performed, thus obtaining, for each value of T, a transfer matrix of N×N size which will be called the windowed frequency transfer matrix $K(T,f)=[k_{ij}(T,f)]$, in which $k_{ij}(T,f)$ is the discrete Fourier transform of $k_{ij}(T,t)$ and f is the frequency.

The single diffusion and multiple diffusion contributions may be separated from these windowed frequency transfer matrices $K(T,f)$ by filtering during a subsequent filtering substep (c3) forming part of the processing step (c).

In particular, during this subsequent filtering substep (c3), the multiple scattering component may be separated from the single scattering component in each windowed frequency transfer matrix $K(T,f)$ as a function of the coherence of the coefficients $k_{ij}(T,f)$ of the windowed frequency transfer matrix $K(T,f)$ along each antidiagonal of said windowed frequency transfer matrix $K(T,f)$ (the term "antidiagonal" refers to an alignment of coefficients $k_{ij}(T,f)$ of said matrix such that i+j is constant).

Specifically, the singly scattered waves have a particular coherence along the antidiagonals of the matrix $K(T,f)$, whereas the multiply scattered waves have a random appearance and do not have a preferential coherence direction in said matrix K(T,f). By judiciously filtering these antidiagonals, the two contributions may thus be separated.

This property may be explained as follows.

Each of the pulsed responses $h_{ij}(t)$ may be decomposed in the following form:

$$h_{ij}(t) = h_{ij}^s(t) + h_{ij}^M(t) \quad (2)$$

in which $h_{ij}^s(t)$ and $h_{ij}^M(t)$ correspond to the signals resulting from single scattering (S) and multiple scattering (M) respectively.

Likewise, the coefficients $k_{ij}(T,f)$ of the windowed frequency transfer matrix K(T,f) may be each decomposed in the form: $k_{ij}(T,f) = k_{ij}^s(T,f) + k_{ij}^M(T,f)$ in which $k_{ij}^s(T,f)$ is the single scattering contribution and $k_{ij}^M(T,f)$ is the multiple scattering contribution.

Each contribution $k_{ij}^s(T,f)$ may be considered as the sum of partial waves associated with several single scattering paths, two examples of which (paths $d_1$ and $d_2$) are shown in FIG. 2. The singly scattered waves which reach the array of sensors in the time window [T−Δt/2; T+Δt/2] correspond to the reflection of the initial wave from scatterers located in a region of the medium with a thickness of ΔR=c·Δt, at the depth R=cT/2.

The term "isochronal volume" is used to denote the set of points which, at a given instant T, contribute to the signal captured b the array. In fact, the isochronal volume is not exactly a slice parallel to the surface of the linear array but results from the superposition of ellipses having the transmitting element (i) and the receiving element (j) as foci. In the far field, i.e. when R is large enough, the isochronal volume is likened to a slice of thickness ΔR parallel to the array and a distance of R=cT/2 from it.

The response $k_{ij}^s$ between the elements i and j may be decomposed into a sum of partial waves resulting from the reflection by the $N_d$ scatterers in the isochronal volume. In two dimensions, in the context of the paraxial approximation, the term $k_{ij}^s(T,f)$ may be expressed in the following form:

$$k_{ij}^s(T, f) = \frac{\exp(2jkR)}{R} \sum_{d=1}^{N_d} A_d \exp\left\{ j\frac{k}{2R}[(x_i - X_d)^2 + (x_j - X_d)^2] \right\} \quad (3)$$

in which the integer d denotes the dth single scattering path contributing to the signal received at time T, $X_d$ is the transverse position of the scatterer d (along the X axis), k is the wavenumber in ambient medium (k=2π=λ, where λ is the wavelength) and $A_d$ is an amplitude characterizing the reflectivity of the scatterer d.

It should be noted in equation (3) above and in the other equations of the present patent application that j is the imaginary number such that $j^2=-1$ when it is not subscripted, but denotes the position of a matrix element when it is subscripted.

Figure 3:
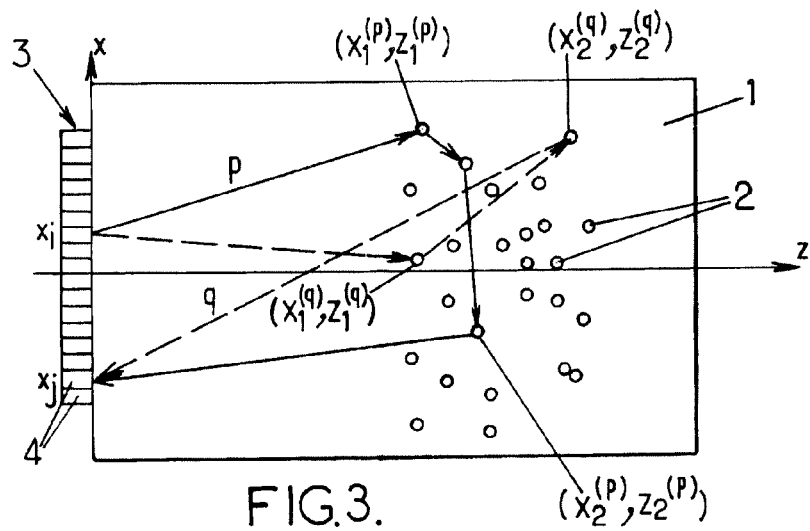
FIG. 3 is a diagram showing two multiple scattering fields contributing to the field backscattered by the probed medium at time T=2R/c in the example of FIG. 1.

The multiple scattering contribution may also be decomposed into partial waves corresponding to multiple scattering paths of length within the [R−ΔR/2; R+ΔR/2] interval, as shown in FIG. 3 (for two paths of indices p and q).

The term $k_{ij}^M(T,f)$ may be expressed in the following form:

$$k_{ij}^M(T, f) = \sum_{p=1}^{N_p} \frac{\exp[jk(Z_1^{(p)} + Z_2^{(p)})]}{\sqrt{Z_1^{(p)} Z_2^{(p)}}} B_p \exp\left\{ j\frac{k}{2Z_1^{(p)}}(x_i - X_1^{(p)})^2 \right\} \exp\left\{ j\frac{k}{2Z_2^{(p)}}(x_j - X_2^{(p)})^2 \right\} \quad (4)$$

in which the integer p denotes the index of the multiple scattering path in question. The pairs $(X_1^{(p)}, Z_1^{(p)})$ and $(X_2^{(p)}, Z_2^{(p)})$ denote the coordinates of the first and last scatterers, respectively, of the path p in the example shown in FIG. 3. $B_p$ corresponds to the complex amplitude of the partial wave associated with the path p, from the first scattering event $(X_1^{(p)}, Z_1^{(p)})$ to the last scattering event $(X_2^{(p)}, Z_2^{(p)})$.

Although the distribution of the scatterers 2 in the medium 1 is completely random and with no correlation between scatterers, the signal associated with the single scattering event $k_{ij}^s$ represents a particular coherence, contrary to the multiple scattering contribution. This is because equation (3) may be rewritten in the form:

$$k_{ij}^S(T, f) = \quad (5)$$

$$\underbrace{\frac{\exp(2jkR)}{R} \exp\left\{ j\frac{k}{4R}(x_i - x_j)^2 \right\}}_{\text{determine contribution}} \times \underbrace{\sum_{d=1}^{N_d} A_d \exp\left\{ j\frac{k}{4R}[(x_i + x_j - 2X_d)^2] \right\}}_{\text{random contribution}}$$

The term appearing at the front of the sum of equation (5) is independent of the precise distribution of the scatterers—it therefore corresponds to a deterministic contribution that characterizes single scattering. The right-hand term is random, as it depends explicitly on the position of the scatterers.

In contrast, the signal associated with the multiple scattering (equation 4) cannot be expressed in such a way.

Figure 4:
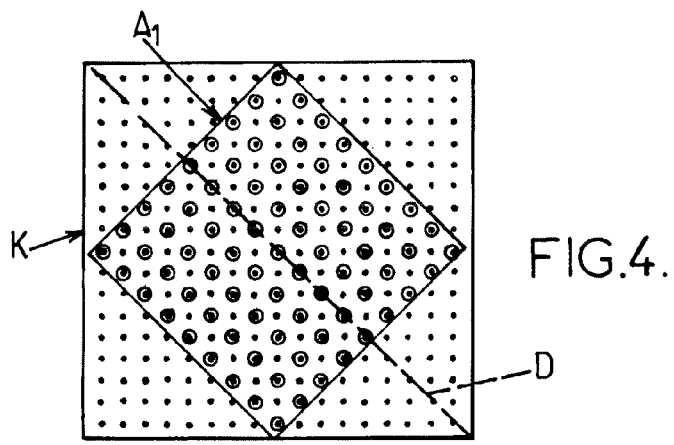
FIGS. 4 and 5 illustrate a data rotation substep belonging to one way of implementing the method according to the invention, during which two matrices A1 and A2 are extracted from each windowed frequency transfer matrix K.

This property of the signals resulting from single scattering corresponds to particular coherence along the antidiagonals of each matrix K(T,f), as illustrated in FIG. 4. This is because along each antidiagonal, i.e. for transmitter (i)/receiver (j) pairs such that i+j=constant, the random contribution of $k_{ij}^s$ is constant. For a given scattering medium, in the single scattering regime, there is therefore a deterministic phase relationship between the coefficients of each matrix K(T,f) that are located along the same antidiagonal.

However, in the multiple scattering regime, this property is no longer verified and the matrix K(T,f) exhibits no particular coherence: the elements $k_{ij}^M$ are independent of one another.

The present invention makes it possible to benefit from this property in order to isolate the single scattering contribution from the multiple scattering contribution by filtering the experimentally measured signals, using the particular symmetry of the single scattering contribution within each matrix K(T,f). Thus, filtering makes it possible to extract:

the single scattering component $k_{ij}^s(T,f)$ of each coefficient $k_{ij}(T,f)$ of the matrix K(T,f), in such a way that the single scattering components $k_{ij}^s(T,f)$ are mutually coherent along each antidiagonal of said matrix K(T,f); and the multiple scattering component $k_{ij}^M(T,f)$ of each coefficient $k_{ij}(T,f)$ of the matrix K(T,f), such that the components $k_{ij}^M(T,f)$ are random and not mutually correlated.

Two examples of filtering techniques that may be used to separate the two contributions are given below.

In these two techniques, the processing step (c) comprises the following two substeps, after the windowed transfer matrix determination substep (c1):

a data rotation substep (c2), whereby the data of each matrix K(T,f) is rotated and two submatrices $A_1(T,f)$ and $A_2(T,f)$ are created;

the abovementioned filtering substep (c3), during which the matrices $A_1$ and $A_2$ are filtered, especially by projection (technique 1) or by decomposition into singular values (technique 2), and therefore two filtered matrices, denoted by $A_1^F$ and $A_2^F$, are obtained; and an inverse data rotation substep (c4), for reconstructing, from $A_1^F$ and $A_2^F$, filtered transfer matrices $K^F(T,f)$ containing either the single scattering contribution or the multiple scattering contribution, depending on the type of filtering employed.

These substeps (c2) to (c4) are explained in detail below.

Data Rotation Substep (c2)

During this substep (c2), the central processing unit 5 calculates two matrices $A1(T,f)=[a1_{uv}(T,f)]$ and $A2=[a2_{uv}(T,f)]$ from each matrix $K(T,f)$, in which:

$a1_{uv}(T,f)=k_{u+v-1,v-u+2M-1}(T,f)$;
$a2_{uv}(T,f)=k_{u+v,v-u+2M-1}(T,f)$; and
$M=(N+3)/4$.

N is chosen so that M is an integer: for example N=125 and M=32. If the total number of transducers 3 is such that M is not an integer, the system operates with a smaller number N of transducers, such that M=(N+3)/4 is an integer (in the particular example considered here, it is possible to use for example a linear array of 128 transducers and to work with only N=125 of them).

Figure 5:
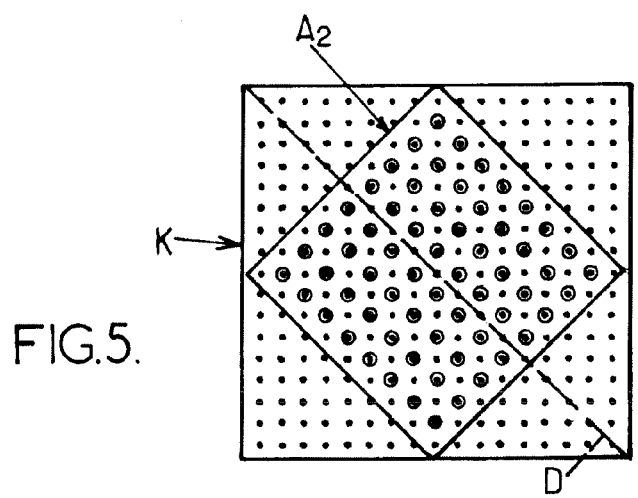

The matrices A1 and A2 are square matrices consisting of subassemblies of the matrix K(T,f) which are rotated through 45° counterclockwise. These matrices A1 and A2, which are shown schematically in FIGS. 4 and 5 respectively, must be as follows:

A1 is a square matrix of (2M−1)×(2M−1) size, the rows of which are formed by certain diagonals of the matrix K(T,f) (one in two), comprising the coefficients of the matrix K(T,f) that are surrounded in FIG. 4 (the coefficients of K(T,f) are indicated schematically by dots in FIGS. 4 and 5); and A2 is a square matrix of (2M−2)×(2M−2) size, the rows of which are formed by the other diagonals of the matrix K(T,f), comprising the coefficients of the matrix K(T,f) which are surrounded in FIG. 5.

In what follows, the matrices A1 and A2 will be referred to as $Ar=[ar_{ij}]$ (r=1 or 2) and the size of the matrix Ar will be termed L (for the matrix A1, L=2M−1 and for the matrix A2, L=2M−2).

Because of the spatial reciprocity, the matrix K is symmetrical with respect to its main diagonal D ($k_{ij}=k_{ji}$). The matrix Ar therefore also has a symmetry: each row its upper part is identical to a row of the lower part, which is symmetrical with respect to a horizontal mid-line corresponding to the main diagonal D. The upper part of the matrix Ar may therefore be deduced directly from the lower part. Thus, each column of the matrix A1 has only M independent coefficients, although it has a size L>M, and each column of the matrix A2 has M−1 independent coefficients. More generally, the number of independent coefficients of the matrix Ar is therefore a number Mr such that Mr=M if r=1 and Mr=M−1 if r=2.

Filtering Substep (c3)

During the filtering substep (c3), the central processing unit 5 separates the multiple scattering component from the single scattering component in each of the matrices Ar, r being an index equal to 1 or 2, thus obtaining at least two filtered matrices $Ar^F$ corresponding to the two matrices Ar respectively and each representative either of the single scattering component or the multiple scattering component.

This filtering may be carried out especially using the abovementioned technique 1 or using the abovementioned technique 2.

1. Technique 1: Projection Filtering

In this first technique, during the filtering substep (c3), the central processing unit 5 calculates two filtered matrices $Ar^F$ which are representative of single scattering.

Each of these filtered matrices is calculated by the formula:

$$Ar^F = S^t S^* Ar, \text{ in which:}$$

$S=[s_u]$ is a column vector, $^tS^*$ being the transpose of the conjugate vector of the vector S;

the components $s_u$ of the vector S are complex numbers equal to:

$$s_u = s \cdot \exp\left\{j\frac{k}{2R} y_u^2\right\} / \sqrt{L};$$

s is a constant, in practice equal to 1 (and therefore not mentioned hereafter);

$y_u=(x_i-x_j)/\sqrt{2}$, with u=(i−j)/2+M if r=1 and u=(i−j−1)/2+M if r=2;

$x_i$ and $x_j$ are the abscissae of the transducers of index i and j along an axis X, the transducer array extending at least along said axis X; and L=2M−1 for r=1 and L=2M−2 for r=2.

This calculation formula is justified as follows.

Each matrix Ar is the sum of two terms, $Ar^S$ and $Ar^M$, denoting the contributions due to single scattering and to multiple scattering respectively:

$$Ar = Ar^S + Ar^M \quad (6)$$

The rotation of the data, i.e. the switch from K(T,f) to Ar, corresponds mathematically to the coordinate change $(x_i, x_j) \rightarrow (y_u, y_v)$:

$$y_u=(x_i-x_j)/\sqrt{2} \text{ and } y_v=(x_i+x_j)/\sqrt{2}.$$

Equation (5) can then be rewritten in this new base:

$$ar_{uv}^S(T,f) = \underbrace{\frac{\exp(2jkR)}{R}\exp\left\{j\frac{k}{2R}y_u^2\right\}}_{\text{determine contribution}} \times \underbrace{\Gamma_v}_{\text{random distribution}} \quad (7)$$

in which $$\Gamma_v = \sum_{d=1}^{N_d} A_d \exp\left\{j\frac{k}{2R}\left[(y_v - \sqrt{2}X_d)^2\right]\right\}.$$

Thus, for a given medium 1, each column of the matrix $Ar^S$ has a dependency according to the perfectly defined index of the rows (u).

In contrast, the multiple scattering contribution (equation 4) cannot be factorized as simply. Even after rotation of the matrix, the random character of the position of the scatterers persists both in the columns and in the rows of the matrix $Ar^M$.

The singly scattered signals may therefore be filtered by projecting the columns of the total matrix Ar onto the space "characteristic of single scattering", generated by the vector S having the coordinates:

$$s_u = \exp\left\{j\frac{k}{2R}y_u^2\right\} / \sqrt{L}. \qquad (8)$$

The presence in the denominator of √L serves to normalize the vector S. The line vector P, the result of this projection, is expressed as:

$$P = {}^tS^*Ar \qquad (9)$$

in which ${}^tS^*$ is the transpose of the conjugate vector of S.

The coordinates of the vector P are given by:

$$p_v = \qquad (10)$$

$$\sum_u s_u^* a_{uv} = \sum_u s_u^* a_{uv}^S + \sum_u s_u^* a_{uv}^M = \sqrt{L}\,\frac{\exp(2jkR)}{R}\Gamma_v + \sum_u s_u^* a_{uv}^M$$

The residual term $$\sum_u s_u^* a_{uv}^M$$

corresponds to the projection of the multiply scattered signals onto the vector S.

Next, the filtered matrix $Ar^F$ is obtained by multiplying the column vector S by the line vector P:

$$Ar^F = SP = S\,{}^tS^*A \qquad (11)$$

The coordinates of the matrix $Ar^F$ are then expressed as:

$$ar_{uv}^F = s_u p_v = \frac{\exp(2jkR)}{R}\exp\left\{j\frac{k}{2R}y_u^2\right\}\Gamma_v + s_u \sum_{u'} s_{u'}^* a_{u'v}^M \qquad (12)$$

The first term is strictly equal to the singly scattered component (equation 7). Therefore:

$$a_{uv}^F = a_{uv}^S + s_u \sum_{u'} s_{u'}^* a_{u'v}^M \qquad (13)$$

In terms of matrices, equation (13) can be rewritten as follows:

$$Ar^F = \underbrace{Ar^S}_{\text{single scattering}} + \underbrace{S\,{}^tS^*A^M}_{\text{residual noise}} \qquad (14)$$

The matrix $Ar^F$ clearly contains the contribution due to single scattering ($A^S$). However, it also contains a residual term due to the presence of multiple scattering ($S\,{}^tS^*A^M$). The persistence of this term is due to the fact that the multiple scattering signals are not strictly orthogonal to the characteristic space of the single scattering, generated by the vector S. The filtering carried out is therefore not perfect, however the magnitude of the residual noise can be evaluated.

This is because, as seen in the paragraph relating to data rotation, each column of the matrix A1 has only M independent coefficients and the matrix A2 M−1 independent coefficients. The multiple scattering contribution is therefore reduced by a factor √Mr after filtering. Since the single scattering contribution remains unchanged, the increase in "signal/noise" ratio, or more precisely "single scattering/multiple scattering" ratio, is therefore of the order of √Mr.

The filtering technique (technique 1) described above is to be used especially when it is desired to extract a single scattering contribution embedded in the multiple scattering, i.e. in the case of media for which the singly scattered signals have a very low amplitude compared with the signals arising from multiple scattering. This applies especially to the case of detecting targets buried in a scattering medium.

2. Technique 2: Filtering by Decomposition into Singular Values

This second technique consists in separating the single scattering from the multiple scattering by performing the singular value decomposition or SVD of the matrices $A_1$ and $A_2$ obtained after rotation. The SVD has in fact the property of decomposing a matrix into two subspaces: a "signal" space (a matrix characterized by a large correlation between rows and/or columns of the matrix) and a "noise" space (a matrix of random appearance, with no correlation between elements). By applying the SVD to the matrices Ar obtained after rotation, the signal space corresponds to the matrix $Ar^S$ (single scattering contribution, characterized by a large correlation along its columns) and the noise space is associated with the matrix $Ar^M$ (multiple scattering contribution), with $Ar = Ar^S + Ar^M$ (equation 6 already mentioned in the section relating to technique 1).

The SVD of the matrices Ar is expressed in the following manner:

$$Ar = U\Lambda\,{}^tV^* = \sum_{i=1}^{L} \lambda_i U_i\,{}^tV_i^* \qquad (15)$$

in which U and V are units where matrices of dimension L, their respective columns $U_i$ and $V_i$ correspond to the eigenvectors associated with the singular value $\lambda_{i,r}$ and $\Lambda$ is a diagonal square matrix of dimension L, the diagonal elements of which correspond to the singular values $\lambda_{i,r}$ arranged in decreasing order. In the section relating to data rotation, a particular symmetry of the matrix Ar was demonstrated: this matrix comprises only Mr independent rows and is therefore of rank Mr<L. Therefore, the matrix Ar has only Mr zero singular values and equation (15) is rewritten as:

$$Ar = U\Lambda\,{}^tV^* = \sum_{i=1}^{Mr} \lambda_i U_i\,{}^tV_i^* \qquad (16)$$

Since single scattering is characterized, after data rotation, by large coherence along the columns of the matrices Ar, the SVD emphasizes this contribution in the signal space (the single scattering contribution will be associated with the highest singular values), whereas the multiple scattering contribution will be associated with the lower singular values. Here, unlike the first filtering technique, there is therefore no a priori assumption as to the form of the coherence existing along the antidiagonals of the matrix K(T,f) in the case of single scattering—it is simply assumed that this coherence exists.

The problem is how to determine what rank of singular value corresponds to the threshold separating the "signal" space (associated with single scattering) from the "noise"

space (associated with multiple scattering). If equation (5) were to be strictly true, only the first of the singular values would correspond to the signal space. When the assumptions leading to equation (5) are not strictly true, the single scattering contribution is not of rank 1 and several singular values bear the trace of this contribution. It is therefore necessary to establish a separation criterion between the single scattering contribution (signal space) and the multiple scattering contribution (noise space).

To do this, the results of random matrix theory are used. By convention, and for the sake of simplification, the singular values $\lambda_{i,r}$ are normalized by their root mean square:

$$\tilde{\lambda}_{i,r} = \frac{\lambda_{i,r}}{\sqrt{\frac{1}{Mr+1-i}\sum_{m=i}^{Mr}\lambda_{m,r}^2}} \qquad (17)$$

For a large matrix, the coefficients of which are completely random, with no correlation between them, the first singular value $\tilde{\lambda}_1$ never exceeds a value $\tilde{\lambda}_{max}$ ($\tilde{\lambda}_{max}=2$ in the case of a square matrix).

Experimentally, the multiple scattering contribution does not correspond at all to a completely random matrix, as residual correlations exist between sensors (especially because of the mechanical or electrical coupling between neighboring transducers of the array 3), thereby modifying $\tilde{\lambda}_{max}$. It is possible to establish from [A. M. Sengupta and P. P. Mitra, "*Distributions of singular values for some random matrices*", Phys. Rev. E, vol. 60(3), pp. 3389-3392, 1999] the new probability law for the singular values of such a matrix and to deduce therefrom the value of $\tilde{\lambda}_{max}$ that will allow an objective separation criterion between the signal space and the noise space to be defined.

After rotation of experimental data, the matrix Ar to be processed (cf. equation 6) is therefore the sum of a matrix $Ar^S$ of rank p<M associated with single scattering and of a matrix $Ar^M$ of rank M associated with multiple scattering that it is desired to filter.

The proposed technique is the following: after having performed the SVD, the central processing unit 5 considers the first singular value $\tilde{\lambda}_{1,r}$ after normalization. If this is greater than $\tilde{\lambda}_{max}$, this means that the first eigenspace is associated with single scattering.

Next, the process is iterated to rank 2 and if necessary to the higher ranks.

Figure 7:
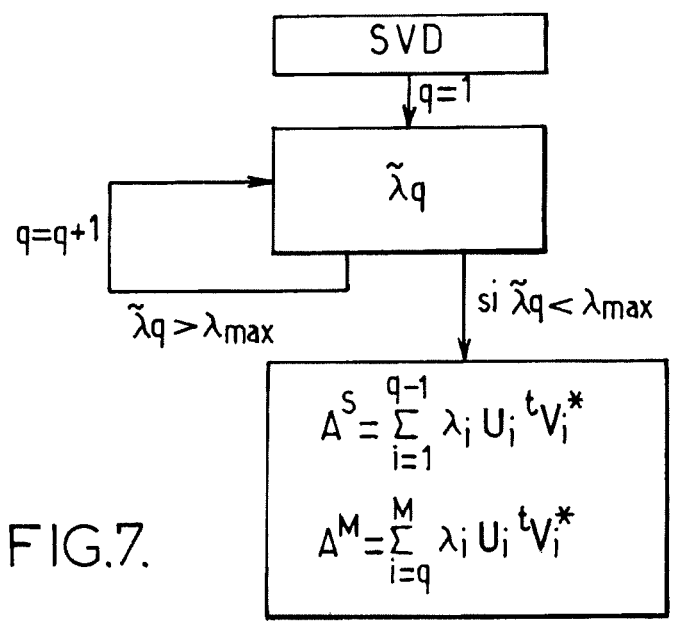
FIG. 7 illustrates an iterative process that can be used for filtering the matrices A1 and A2 by decomposition into singular values.

As shown in FIG. 7, the processing carried out by the central processing unit 5 is therefore iterative processing, comprising the following substeps:

(c31) q is initially set to 1;
(c32) a normalized singular value is calculated from;

$$\lambda_{q,r} : \tilde{\lambda}_{q,r} = \frac{\lambda_{q,r}}{\sqrt{\frac{1}{Mr+1-q}\sum_{m=q}^{Mr}\lambda_{m,r}^2}},$$

(c33) if $\tilde{\lambda}_{q,r}$ is at least equal to a predetermined threshold value $\tilde{\lambda}_{max}$, $\tilde{\lambda}_{q,r}$ is assigned to the single scattering and substep (c32) is repeated, q being incremented by unity; and
(c34) if $\tilde{\lambda}_{q,r}$ is below the threshold value $\tilde{\lambda}_{max}$, then $\tilde{\lambda}_{q,r}$ and the possible following singular values are assigned to the multiple scattering.

If the rank for which $\tilde{\lambda}_{p+1,r} < \tilde{\lambda}_{max}$ is called p+1, the following are thus obtained:

$$Ar^S = \sum_{i=1}^{P} \lambda_{i,r} U_i^t V_i^* \qquad (19)$$

$$Ar^M = \sum_{i=p+1}^{Mr} \lambda_{i,r} U_i^t V_i^* \qquad (20)$$

The matrix $Ar^S$ then contains the single scattering contribution (plus a residual multiple scattering contribution) and the matrix $Ar^M$ is associated with the multiple scattering.

It should be noted that technique 2 assumes that the first of the normalized singular values exceeds the threshold $\tilde{\lambda}_{max}$. It cannot be used in a highly scattering medium, i.e. a medium for which the multiple scattering contribution is predominant compared with single scattering. In this case, the technique of filtering by projection of the antidiagonals onto the single scattering space (technique 1) for extracting the single scattering contribution will be used instead. If on the contrary the single scattering contribution is predominant or of the same order of magnitude as the multiple scattering, the technique of filtering by SVD of the matrices A (technique 2) may be used and the multiple scattering contribution thus extracted.

Inverse Data Rotation Substep (c3)

During the inverse data rotation substep (c4), the central processing unit 5 performs an inverse transformation of the transformation described in substep (c1) and thus calculates a filtered windowed transfer matrix $K^F(T,f)=[k^F_{ij}(T,f)]$, where:
when i–j is even: $k^F_{ij}(T,f)=a1^F_{(i-j)/2+M,\ (i+j)/2}$,
when i–j is odd: $k^F_{ij}(T,f)=a2^F_{(i-j-1)/2+M,\ (i+j-1)/2}$.

Figure 6:
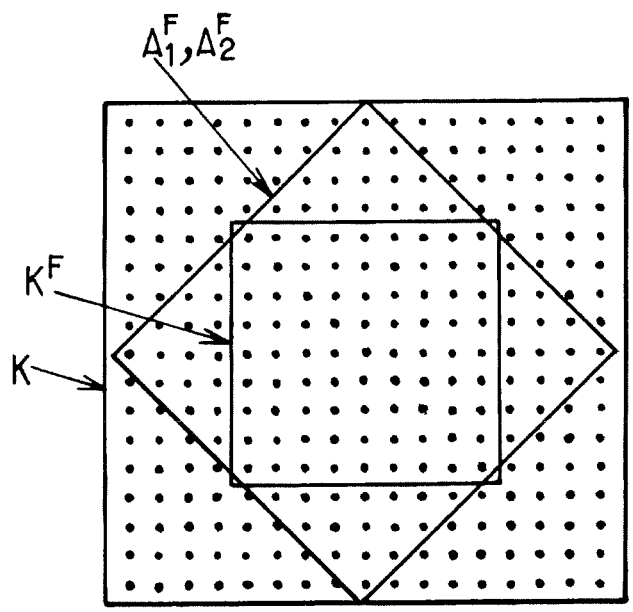
FIG. 6 illustrates an inverse data rotation substep during which a filtered transfer matrix $K^F$ is determined from the abovementioned matrices A1 and A2, after said matrices have been filtered.

The matrix $K^F(T,f)$ is a square matrix of (2M−1)×(2M−1) size, containing signals resulting either from single scattering or from multiple scattering, depending on the type of filtering applied. The inverse data rotation procedure is illustrated schematically in FIG. 6, which shows that the matrix $K^F(T,f)$ adopts some of the coefficients of the antidiagonals of the matrices A1(T,f) and A2(T,f).

The filtered matrices $K^F(T,f)$ may then be used in various ways:
if $K^F(T,f)$ corresponds to the single scattering component, it may be used in particular for detecting a singular point in the medium 1 or for constructing an image of the medium 1. For this purpose, two imaging methods may for example be used:
according to a first imaging method, the central processing unit 5 may for example calculate, from each matrix $K^F(T,f)$, by inverse Fourier transform, a filtered windowed temporal inter-element response matrix $H^F(T,t)$ and then add together the various temporal matrices $H^F(T,t)$ in order to obtain a filtered temporal inter-element response matrix $H^F(t)$ representative of the responses between transducers of the transducer array. The central processing unit then produces the image of the medium via path formation on the basis of said filtered temporal inter-element response matrix $H^F(t)$;
according to a second imaging method, called the TROD (time reversal operator decomposition) method (defined in particular by Prada et al., "Eigenmodes of the time reversal operator: a solution to selective focusing in multiple-target media", Wave Motion 20 (1994) 151-163, Elsevier Science B.V.), the central processing unit 5 may carry out the following steps:

(d1) determination, for each filtered transfer matrix $K^F(T,f)$, of a time reversal operator $TRO(T,f)=K^{F*}(T,f)K^F(T,f)$, corresponding to the or each transfer matrix $K^F(T,f)$, where $K^{F*}(T,f)$ is the complex conjugate matrix of $K^F(T,f)$, (d2) determination of at least eigenvectors and/or eigenvalues of said time reversal operator, and (d3) detection of at least one singularity in the medium as a function of at least said eigenvectors and/or said eigenvalues. During this step (d3), eigenvectors $V_i(f)$ of the time reversal operator may in particular be determined and then these eigenvectors may be numerically propagated in a numerical model of the medium 1, in order to determine a position of an object reverberating in the medium 1 corresponding to each eigenvector; and if the matrices $K^F(T,f)$ correspond to the multiple scattering component, they may be used especially for calculating, from said multiple scattering component, an index representative of the magnitude of the multiple scattering in the medium. In this case, an image (whether an echographic image or another image) of the medium may for example be produced by any known means or by the abovementioned methods, and the reliability of said image is quantified according to said index representative of the magnitude of the multiple scattering. Advantageously, this index may be calculated at several points (especially at various depths R) and the reliability of several parts of the image corresponding to said several points, as a function of said index representative of the magnitude of the multiple scattering, is quantified.

Several possible examples of applying the method according to the invention will now be described in detail.

Application 1: Detection of a Target in a Scattering Medium

The application presented here consists in detecting a target (a large reflector) buried in a scattering medium (a medium with a very high concentration of small scatterers) by isolating the single scattering contribution coming from the target using the projection filtering technique (the filtering technique 1 mentioned above).

Figure 8:
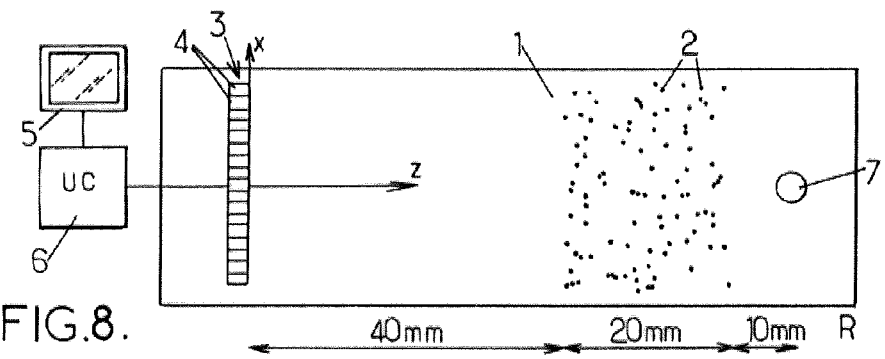
FIG. 8 illustrates an experimental device used an experiment for detecting a target in a scattering medium.

The experimental device is shown in FIG. 8. The transducer array 3 as described above in regards to FIG. 1 is placed in a water bath 1 forming the medium 1. The medium 1 contains a large number of scatterers 2 placed for example at a distance R of about 40 mm from the transducer array 3 and over a depth of field of about 20 mm. This distance R and this depth of field are measured along the axis Z. The scatterers may for example consist of a number of steel rods 0.8 mm in diameter randomly distributed with a concentration of about 12 rods/cm$^2$. The typical mean free path $l_e$ for this medium 1 is 7 mm, so that said medium is highly scattering. The target 7 is placed for example at about 10 mm behind the set of scatterers 2. This target 7 may for example be a steel rod with a diameter of 10 mm.

The temporal inter-element response matrix H(t) is determined as follows: a chirp signal linearly scanning a 2 to 4 MHz frequency band is transmitted by the transducers. The signals reverberated by the medium 1 are then recorded by the transducers 3 before being convoluted by the transmission signal so as to obtain the pulsed response between each pair of transducers. The transducer array may take the form of a linear echographic array having 128 channels with an inter-element pitch of 0.417 mm. The matrix H(t) therefore has a size of 128×128.

This matrix is then cut temporally according to equation (1) with temporal windows of length $\Delta t=5.5$ μs.

Each window half overlaps with its neighbors. A series of matrices K(T,t) is obtained and the switch to the frequency domain is then carried out by a discrete Fourier transform, thereby resulting in the formation of a series of matrices K(T,f). In the rest of the study, only the 2.5-3.5 MHz frequency bank will be considered.

Figure 9:
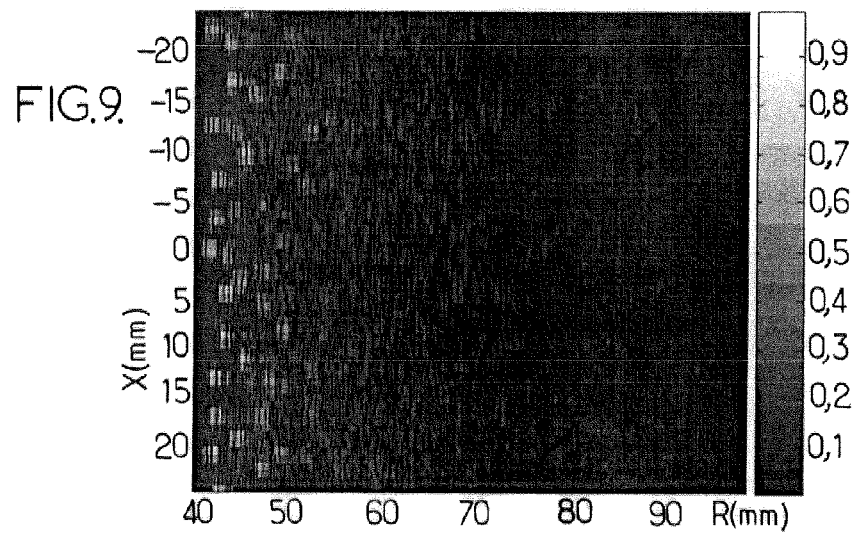
FIGS. 9 and 10 are examples of images of the medium of FIG. 8, obtained by conventional echography (with a linear gray scale in the case of FIG. 9 and a logarithmic scale in the case of FIG. 10)
Figure 10:
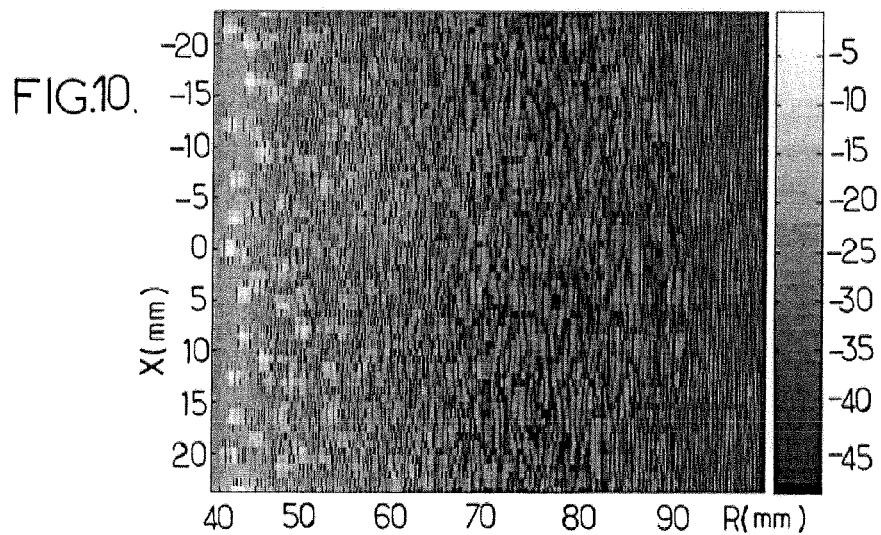

FIGS. 9 and 10 show the images of the medium 1 obtained from the matrix H(t) (with a linear scale in the case of the amplitude of the signal in FIG. 9 and with a logarithmic scale in FIG. 10) using conventional echography methods, by path formation focused at transmission and at reception. It is impossible to distinguish detect the target, located here at R=70 mm. The first scatterers of the disordered medium are clearly detected (over about 1 cm in thickness, i.e. a thickness comparable to the mean free path), but thereafter the multiply scattered signals take over and a speckle image is then obtained, with no physical correspondence with the presence of targets.

It has also been attempted to process the signals obtained using the abovementioned TROD method, without the filtering according to the invention. This method consists in decomposing each matrix K(T,f) into singular values:

$$K = U\Box^t V^* \quad (21)$$

with the notations already defined above.

It is known that, in the absence of noise and for point targets in the single scattering regime, each non-zero singular value is associated with a target in the medium. At each frequency, the singular value $\lambda_i$ is proportional to the reflectivity of the ith target and the eigenvector $V_i$ describes the signal that allows a wave to be refocused onto the scatterer in question.

The TROD method therefore makes it possible to distinguish various targets and to focus the wave selectively on each target. In addition, if a target is detectable in one frequency band but not in another, the frequency band in which the target is detected may be selected so as to construct its image, whereas with conventional echography the entire frequency band of the incident signal is used to reconstruct the image of the medium, thereby degrading the quality of the final image.

The TROD method was tested here on the series of matrices K(T,f): an SVD (singular value decomposition) operation was carried out at each echo time T and at each frequency f. For each matrix K(T,f), the first singular value is normalized by the root mean square of the singular values:

$$\tilde{\lambda}_1 = \frac{\lambda_1}{\sqrt{\langle \lambda_i^2 \rangle}} \quad (22)$$

in which $\tilde{\lambda}_1$ represents the 1st normalized singular value.

The purpose of this normalization is to define a target detection criterion: if $\tilde{\lambda}_1 < \tilde{\lambda}_{threshold}$, then no target is detected; otherwise, this indicates the presence of a target at the depth R corresponding to the echo time T and to the frequency f. The threshold value $\tilde{\lambda}_{threshold}$ is determined from the random matrix theory. In terms of the "single scattering/multiple scattering" ratio, this threshold value indicates that the target will be detected if and only if:

$$\left[\frac{\sigma_S}{\sigma_M}\right]_{TROD} > \frac{\tilde{\lambda}_{threshold}}{\sqrt{N}} \quad (23)$$

in which N is the number of transducers, $\sigma_S$ represents the amplitude of the singly scattered signal coming from the target and $\sigma_M$ the amplitude of the multiply scattered signals. In the present case, the TROD method used without the filtering according to the invention did not allow the target 7 to be detected in the experimental configuration studied: for no echo time T and no frequency f did the first normalized singular value $\tilde{\lambda}_1$ exceed the threshold value $\tilde{\lambda}_{threshold}$.

Moreover, the TROD method was coupled with prior filtering of the single scattering by projection of the antidiagonals (method 1, explained above). For this purpose, the TROD method was applied, as described above, but on the series of filtered matrices $K^F(T,f)$ obtained by the filtering method 1 and essentially containing the single scattering contribution. For each of these matrices, the first singular value is normalized according to equation (22). The random matrix theory allows us, as previously, to establish a target detection criterion of the type $\tilde{\lambda}_1 > \tilde{\lambda}_{threshold}$, with a given false alarm probability, and depending on the value $\tilde{\lambda}_{threshold}$: if $\tilde{\lambda}_1 < \tilde{\lambda}_{threshold}$, no target is detected; otherwise, this indicates the presence of a target at the depth R corresponding to the echo time T. Thanks to the prior extraction of the single scattering, the detection threshold for the TROD method is markedly improved (i.e. reduced), since the amplitude of the multiple scattering contribution was reduced by a factor of $\sqrt{Mr}$ (cf. section 111.2). The detection threshold of the present invention is therefore reduced by a factor of $\sqrt{Mr}$ relative to that obtained with the TROD method (equation 23) alone.

Figure 11:
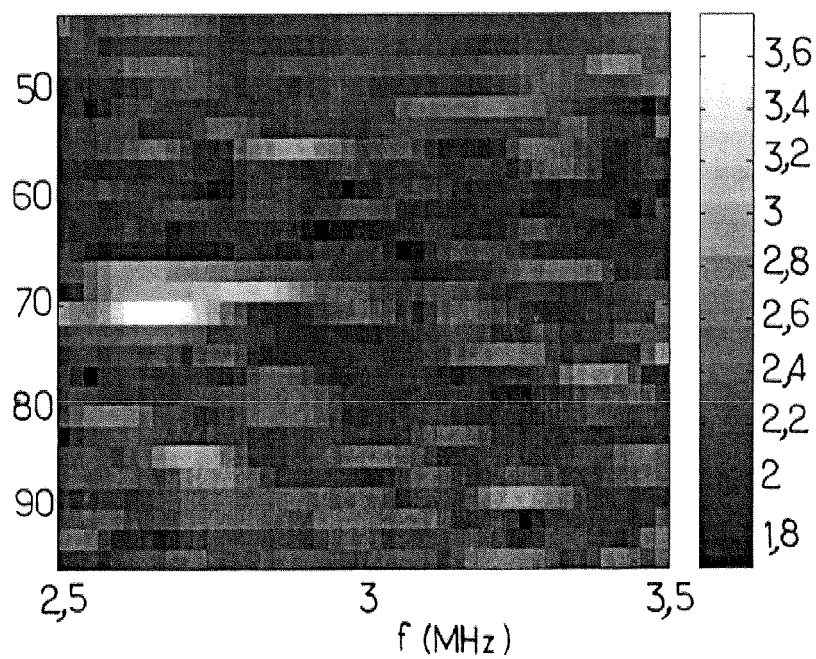
FIGS. 11 and 12 are distance-frequency graphs in which the gray scale show the first normalized singular value as a function of the frequency f and of the distance R from the transducer array in the device of FIG. 8, after filtering by decomposition into singular values (with no threshold effect in FIG. 11, and being limited to singular values above a predetermined threshold in FIG. 12)
Figure 12:
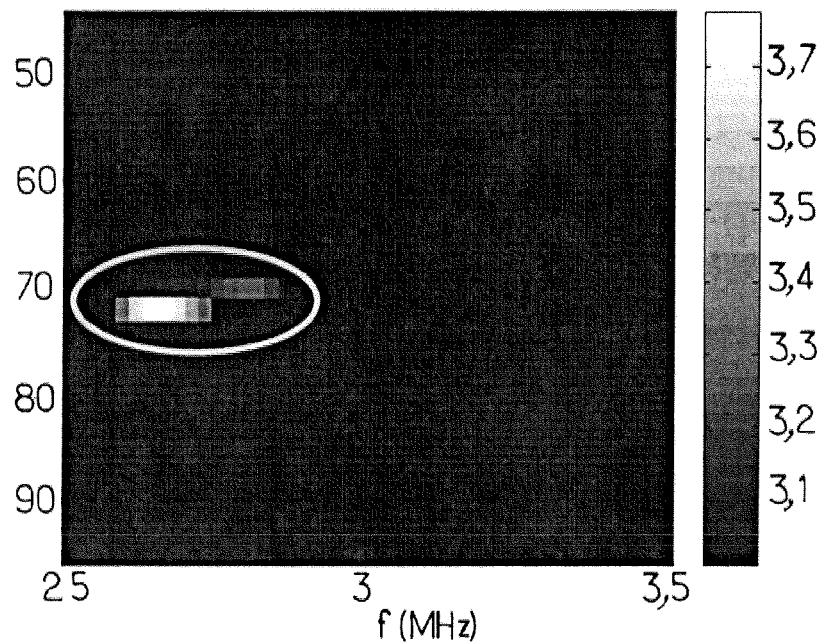

In the experimental configuration studied, we have selected here the threshold value $\tilde{\lambda}_{threshold}=3$, which corresponds to a false alarm probability of less than 0.1%. FIGS. 11 and 12 show the variation in $\tilde{\lambda}_1$ with the distance R (corresponding to the echo time T such that R=cT/2) and the frequency f, without thresholding in the case of FIG. 11 and with thresholding to the threshold value $\tilde{\lambda}_{threshold}=3$ in the case of FIG. 12.

Contrary to what was obtained under the same conditions using the TROD method alone (no target could be detected), filtering the single scattering makes it possible to detect the target since the first singular value $\tilde{\lambda}_1$ exceeds the threshold value $\tilde{\lambda}_{threshold}$ over a certain frequency range at the target echo time.

Once the detection criterion has been applied, the image of the target may be obtained (FIG. 13) by numerically repropagating the eigenvectors $V_i$ at depths R(=cT/2) and frequencies f for which the first singular value satisfies the detection criterion. What is thus obtained is an image of the target that allows it to be located, something which neither echography nor the TROD method alone was able to do.

Figure 13:
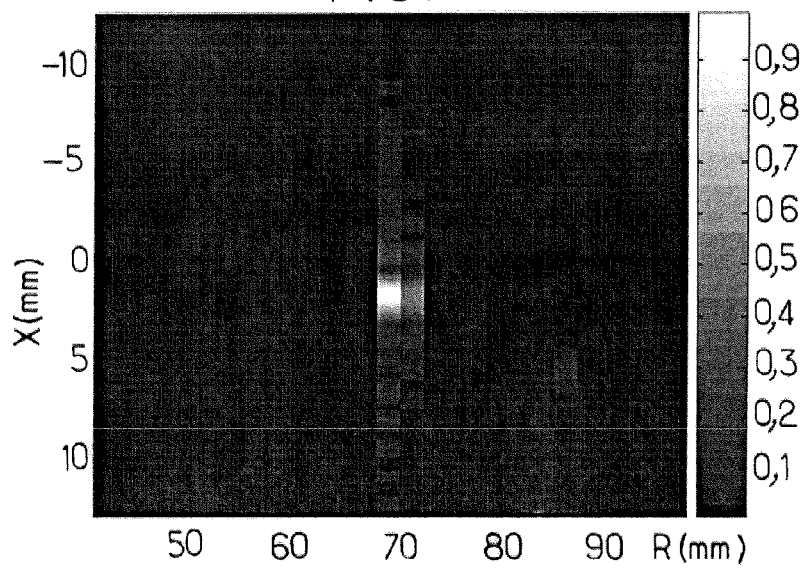
FIG. 13 is an image of the medium reconstructed by digital repropagation of the eigenvectors, after decomposition into singular values of the time reversal operator.
Figure 14:
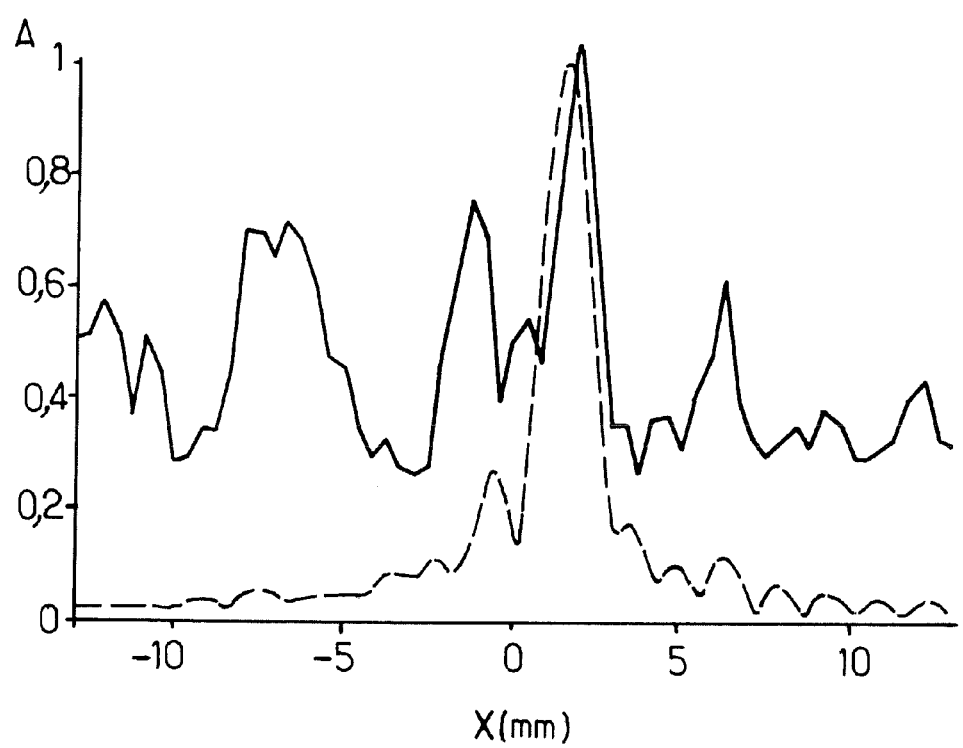
FIG. 14 is a graph giving the normalized amplitude A of the pixels of the image of the medium by the device of FIG. 8, in a plane perpendicular to the axis Z and passing through the target, in conventional echography and after filtering by decomposition into singular values according to one embodiment of the invention.

FIG. 14 compares the normalized amplitude of the signal of the image in the plane of the target 7:
  in the case of the image in FIG. 13 (dotted curve), which corresponds to filtering the single scattering contribution associated with the TROD method);
  and in the case of the image in FIG. 9 (solid curve), corresponding to conventional echography.

It may be seen that the signal obtained using the present invention (dotted curve) is markedly better and enables the target 7 to be easily discriminated, unlike the signal obtained by conventional echography. It may in fact be shown that the improvement in the signal-to-noise ratio in the final image increases as N in the case of echography and as $N^{3/2}$ with the technique of the invention, N denoting the number of transducers in the array 3. The echographic image (solid line) has quite large side lobes, due to the aberration induced by the scattering medium. On the basis of such an image, it cannot be concluded with certainty that the main peak is actually due to the presence of a target: statistically, it may be a false alarm due to the fluctuations inherent in the random nature of the multiple scattering. To achieve a false alarm probability of less than 0.1%, it may be shown that it would be necessary here for the main peak to have a value 2.5 times higher than the average of the amplitude of the echographic image, which is not the case. Finally, the main peak of the echographic image is not found exactly at the correct position; in contrast, the image obtained with the invention does not seem to suffer from aberration.

In conclusion, the technique developed here, which allies filtering of the single scattering with the TROD method, improves the capabilities of an array of transmitter/receivers to detect and image a target concealed behind a screen multiply scattering the waves.

On the one hand, the frequency-time analysis involved allows the frequency bands favorable to target detection to be selected, which selection is impossible with conventional echography. A theoretical analysis based on random matrix theory demonstrates that, under identical conditions, the false alarm probability in a scattering medium is lowered by our technique.

On the other hand, this technique reduces the aberration effects (appearance of side lobes, shift of the main lobe, etc.), from which the conventional imaging techniques suffer.

Application 2: Study of a Very Weakly Scattering Medium

Unlike the above application, we consider here the case of a weakly scattering disordered medium: the single scattering contribution then dominates the multiple scattering. In this type of medium, the conventional techniques such as echography function well and make it possible to construct reflectivity images of the medium since the multiple scattering is of minor importance—it disturbs the echographic image obtained only very slightly. However, the aim here is to obtain other useful information in the study of propagating media: especially parameters purely characterizing the multiply scattered portion of the wave. These parameters are the various "mean free paths" within the medium; once the multiple scattering contribution has been isolated using our technique, it is possible to measure these parameters, something which the conventional echographic imaging techniques cannot do.

When a wave propagates within a random scattering medium, it progressively loses its coherence exponentially: after a distance L, only a fraction exp $(-L/l_{ext})$ of the initial energy continues to propagate coherently with the initial wave. The parameter $l_{ext}$, the overall extinction free path, therefore characterizes the extinction distance of the coherent part of the wave. This progressive extinction of the coherent wave has two separate origins: scattering (at each encounter with a scatterer, part of the initial coherence is lost) and intrinsic absorption of the propagating medium. Associated with these two phenomena are two other characteristic lengths: the elastic mean free path $l_e$ and the absorption mean free path $l_a$, such that:

$$\exp\left(-\frac{L}{l_{ext}}\right) = \underbrace{\exp\left(-\frac{L}{l_e}\right)}_{\text{scattering loss effect}} \times \underbrace{\exp\left(-\frac{L}{l_a}\right)}_{\text{absorption loss effect}},$$

and therefore $$\frac{1}{l_{ext}} = \frac{1}{l_e} + \frac{1}{l_a}$$

Measuring the overall extinction length $l_{ext}$ is useful, but it does not allow a distinction to be made between the absorption losses $(l_a)$ and the scattering losses $(l_e)$. Using the single scattering/multiple scattering separation technique according to the invention, by selecting the multiple scattering contribution in the response by the medium, it is possible to measure $l_e$ and $l_a$ separately and thus characterize the probed medium more completely.

To illustrate the feasibility and the benefit of such measurements, the single scattering/multiple scattering separation technique according to the invention was firstly applied to a synthetic medium (a weakly scattering agar-agar gel). The experimental setup was similar to that of FIG. 1, but the sample of scattering medium was placed in a water bath at a distance a=50 mm from the transducer array 3, this sample having a thickness L=100 mm along the Z axis.

The multiple scattering contribution was extracted from a series of matrices $K^F(T,f)$ obtained by technique 2 described above.

Once the multiple scattering contribution had been isolated, the average multiscattered intensity $I^M$ was calculated as a function of the transmitter/receiver separation X (the distance between the transmitting transducer i and the receiving transducer j) and of the echo time T:

$$I^M(X=x_j-x_i,T)= \left\langle \left\| k_{ij}^M(T,f) \right\|^2 \right\rangle_{\{f,(x_i,x_j)\}} \quad (24)$$

It should be recalled that the term $|k_{ij}^M(T,f)|^2$ denotes the coefficients (ith row, jth column of the matrix $K^M(T,f)$. The symbols $<\ldots>$ represent an average taken, on the one hand, over the entire frequency band f and, on the other hand, over all the source/receiver (i,j) pairs separated by $X=x_j-x_i$.

Moreover, an additional result is provided by examining the temporal variation in the simply and multiply scattered intensities obtained at the source point (X=0), this being denoted by $I^S(0,T)$ and $I^M(0,T)$. Specifically, the theory of radiative transfer [J. Paasschens, "*Solution of the time-dependent Boltzmann equation*", Phys. Rev. E, Vol. 56(1), pp 1135-1141, 1997] shows that analytical solutions exist that predict the temporal variation in $I^S(0,T)$ and $I^M(0,T)$. In particular, it appears that the temporal variation in the singly scattered intensity $I^S(0,T)$ depends only on the extinction free path $l_{ext}$.

Figure 15:
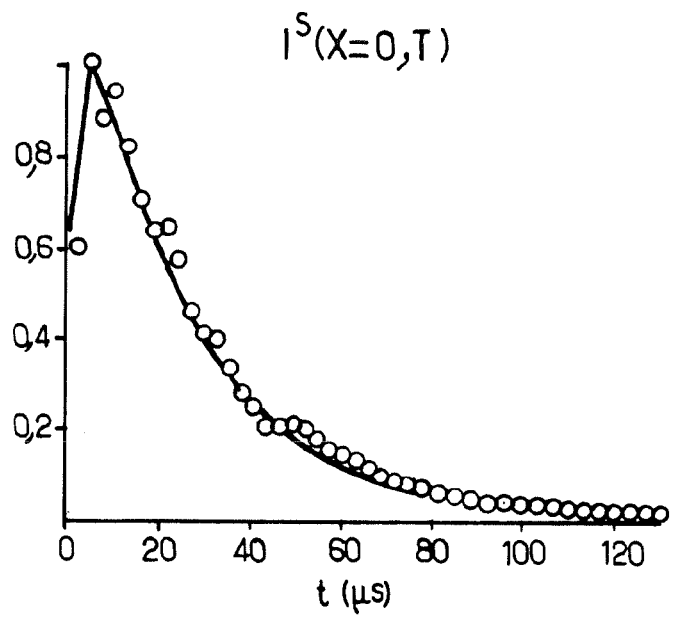
FIG. 15 is a graph giving the measured curve of the singly scattered intensity $I^S$ (X=0,T) (represented by points in the form of small circles) and the theoretical curve of this intensity for a free path of extinction $l_{ext}$=50 mm.

In the case of the agar-agar gel studied here, an adjustment between the theoretical prediction and the result of the experiment (FIG. 15) results in the value $l_{ext}$=50 mm.

To check this, the total scattered intensity $I(0,T)$ and the multiply scattered intensity $I^M(0,T)$ were measured as explained above and the singly scattered intensity $I^S(0,T)$ was deduced therefrom by taking the difference. As a variant, $I^S(0,T)$ may be measured by applying formula (24) no longer to the coefficients of the matrix $K^M(T,f)$ but to the coefficients of the matrix $K^S(T,f)$ determined for example using method 2 described above. The measured $I^S(0,T)$ curve, represented by points in FIG. 15, was normalized by its maximum (set to 1). The temporal variation of $I^S(0,T)$ predicted by the exact solution of the radiative transfer equation was also calculated for several extinction mean paths. This curve, also normalized by setting its maximum value to 1, was fitted to the experimental curve for an extinction free path $l_{ext}$=50 mm (the solid curve in FIG. 15), enabling it to be determined that $l_{ext}$=50 mm.

Figure 16:
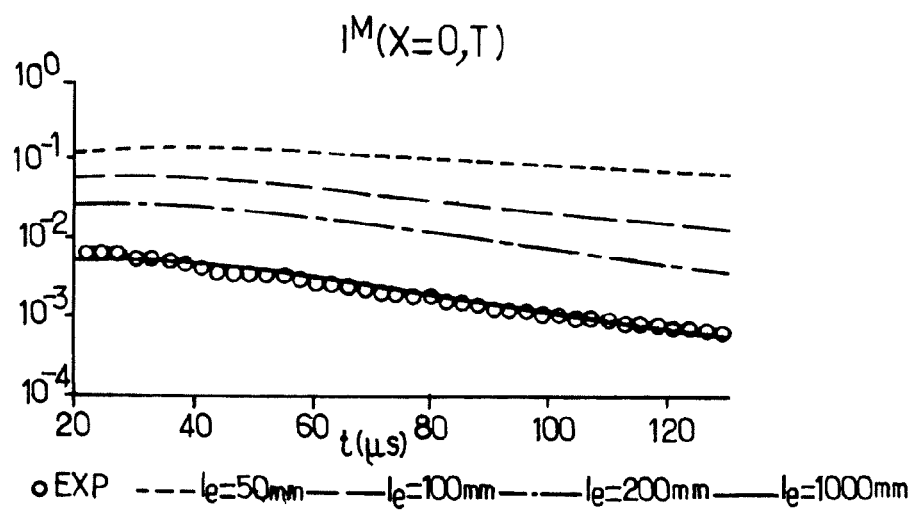
FIG. 16 is a similar graph (on a logarithmic scale) giving the measured curve of the multiply scattered intensity $I^M$(X=0,T) (represented by points in the form of small circles) and the theoretical curve of this intensity for four values of the elastic mean free path $l_e$, these curves being normalized by the $I^S$ maximum.

If the temporal variation in the multiply scattered intensity $I^M(X=0,T)$ is now considered, the theory shows that this depends separately on the mean free paths $l_e$ and $l_a$. Thus, $l_e$ may be determined by fitting the experimental measurements of $I^M(X=0,T)$ to the theory (FIG. 16), thereby giving $l_e$=1000 mm. This result is obtained by determining the value of $l_e$ for which the theoretical curve of $I^M(X=0,T)$ fits onto the experimental curve (curve EXP indicated by points in the form of small circles in FIG. 16). From this $l_a$ is deduced by the formula $$\frac{1}{l_{ext}} = \frac{1}{l_e} + \frac{1}{l_a},$$

giving $l_a$=50 mm.

Being able to separate the single scattering contribution from the multiple scattering contribution therefore makes it possible to measure the absorption losses separately from the scattering losses. Here, the specimen studied was much more absorbent than scattering, since an elastic mean free path $l_e$~1000 mm was found, while the absorption free path $l_a$ was around 50 mm.

This experiment shows that the invention allows the scattering medium to be better characterized, by measuring the diffusive parameters ($l_e$, $l_a$) separately, something which conventional echography is unable to do. Here, an extreme case (weakly scattering gel) in which the $I^M/I^S$ ratio is particularly low was considered, but the technique also applies for media that are more scattering, for which the $I^M/I^S$ ratio is close to unity.

Application 3: Ultrasonic Imaging of the Human Body

Figure 17:
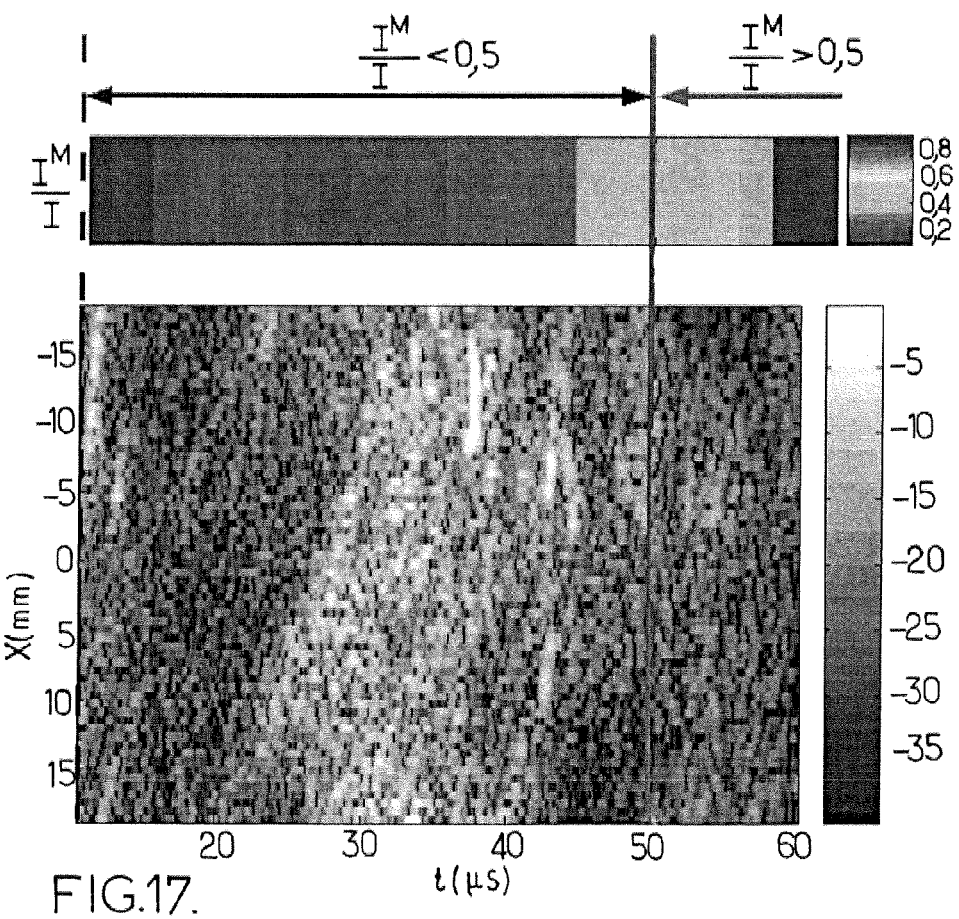
FIG. 17 is an echographic image of human tissue, coupled to a graph, the gray level of which gives the value of a reliability index based on the relative importance of the multiple scattering.

The experimental setup of FIG. 1 was used to image the breast of a volunteer using conventional echography. The image obtained is shown in FIG. 17.

At the same time, the filtering technique 2 was used to determine the multiply scattered intensity $I^M$, as in application 2 above, and the ratio $I^M/I$, in which I is the total scattered intensity, was then calculated as a function of the distance R measured along the Z axis (i.e. as a function of the round-trip time t of the singly scattered wave). The values of the ratio $I^M/I$, which is a reliability index between 0 and 1 representative of the amount of multiple scattering—and therefore also representative of the magnitude of the single scattering in the medium 1—have been plotted as a gray scale in the strip in the upper part of FIG. 17, which thus makes it possible to determine the ratio $I^M/I$ as a function of t (this ratio could be plotted as color levels or by a curve). In FIG. 17, the vertical line indicates the limit of t (and therefore of R) at which the $I^M/I$ ratio reaches a critical threshold (here for example 0.5) beyond which the echographic image can no longer be trusted, based on the fact that the single scattering is predominant.

Thus, it is therefore possible to help practitioners in the field of medical imaging or the like, by providing them with additional information regarding the reliability of the image. Specifically, when multiple scattering becomes predominant, the echographic image no longer has any meaning and the multiple scattering may be a source of errors.

Other Applications:

As regards extracting the single scattering and the possibility of applying it to the detection of a target buried in a scattering medium, two additional examples of its application may be mentioned:

nondestructive testing (NDT): in materials such as concrete or grained steels, multiple scattering is far from being negligible and the detection of cracks or faults may prove to be difficult in such media. Extracting the single scattering contribution according to the invention may alleviate this drawback;

detection of targets buried in the ground (for example solid objects, cavities, pockets of fluids, etc.): the ground is a medium that scatters waves used for detecting buried objects. Filtering out the single scattering according to the invention, coupled with the TROD method, gives much better results than standard echography in such media; and the single scattering filtering technique by projection along the antidiagonals may also be applicable to quite simply noisy data. This is often the case with "actual" data, such as in NDT or subsea acoustics in which the signal/noise ratios are very low. In this case, the TROD method with prior filtering of the antidiagonals will give a more advantageous result than that obtained using echography in terms of false alarm probability. This method will also reduce the aberration effects with which conventional imaging techniques are confronted.

As regards extracting the multiple scattering and the possibility of characterizing the medium on the basis of its diffusive parameters, here again there are a variety of possible applications:

medical imaging: the multiple scattering of ultrasonic, often forgotten or neglected in soft tissue in the human body, clearly exists. The invention makes it possible to extract the multiple scattering so as to characterize the various tissues probed in the human body. This enables novel measurements to be made that standard echography cannot provide. For example, in the presence of a tumor, substantial vascularization occurs with a microscopic network of vessels for supplying it. It may be reasonably considered that such vascularization leads to an increase in the multiply scattered intensity and would therefore be detectable using the technique of the invention. This would then make it possible to quantify the angiogenesis of tumors and would offer better diagnostics than currently obtained. Another example is given by monitoring osteoporosis, since bones, when they become porous, are particularly scattering. By extracting the multiple scattering it would be possible to obtain measurements of diffusive parameters and to image the local porosity of the bone;

nondestructive testing: materials such as grained steels, concrete and more generally granular materials are the site of multiple scattering. By extracting the multiple scattering, even in a small amount, it would then be possible to characterize and/or image the materials on the basis of their diffusive behavior and to link this to the microarchitecture of the probed material; and in the field of seismic measurements and subsoil studies, it is also beneficial to separate the two, single and multiple, scattering contributions. cm The invention claimed is:

The invention claimed is:

1. A wave-propagation probing method using an array of transducers, said method comprising:
  (a) a transmission step during which the transducer array transmits an incident wave into a medium that scatters said wave;
  (b) a measurement step during which said transducer array captures signals representative of a reflected wave reverberated by the medium on the basis of the incident wave, said captured signals comprising:
    a single scattering component representative of wave paths in which the reflected wave results from a single reflection of the incident wave by each scatterer in the medium, and
    a multiple scattering component representative of wave paths in which the reflected wave results from several successive reflections of the incident wave by the scatterers in the medium before reaching the transducer array; and
  (c) a processing step during which said captured signals are processed using a central processing unit (CPU) so as to determine characteristics of the medium, wherein, during the processing step (c), at least one component chosen from the multiple scattering component and the single scattering component is extracted, by filtering at least one frequency transfer matrix representative of the responses between transducers of the transducer array, wherein the processing step (c) comprises at least the following substeps:
  (c1) a windowed transfer matrix determination substep during which at least one windowed frequency transfer matrix $K(T,f)=[k_{ij}(T,f)]$, corresponding to a windowed temporal inter-element response matrix $K(T,t)=[k_{ij}(T,t)]$, is determined, said windowed temporal inter-element response matrix corresponding, over a neighboring temporal window of time T and duration $\Delta t$, to the temporal responses $h_{ij}(t)$ between transducers of the transducer array, f being the frequency;
  (c3) a filtering substep during which the multiple scattering component is separated from the single scattering component in each windowed frequency transfer matrix $K(T,f)$ as a function of the coherence of the coefficients $k_{ij}(T,f)$ of the windowed frequency transfer matrix $K(T,f)$ along each antidiagonal of said windowed frequency transfer matrix $K(T,f)$.

2. The method as claimed in claim 1, in which the multiple scattering component is non-zero.

3. The method as claimed in claim 1, in which, during the processing step (c), the single scattering component is extracted and said single scattering component is used to detect at least one singular point in the medium.

4. The method as claimed in claim 3, in which, during the processing step (c), an image of the medium is produced on the basis of said single scattering component.

5. The method as claimed in claim 4, in which, during the processing step (c), said single scattering component in the form of a filtered temporal inter-element response matrix HF, representative of the responses between transducers of the transducer array, is determined and the image of the medium is produced by path formation on the basis of said filtered temporal inter-element response matrix HF.

6. The method as claimed in claim 4, in which, during the processing step (c), said single scattering component in the form of at least one filtered frequency transfer matrix KF, representative of the responses between transducers of the transducer array, is determined and the image of the medium is produced by the method of decomposing the time reversal operator $KF^* \cdot KF$, in which $KF^*$ is the complex conjugate matrix of said filtered frequency transfer matrix KF.

7. The method as claimed in claim 1, in which during the processing step (c), the multiple scattering component is extracted and a reliability index representative of the magnitude of the single scattering in the medium is calculated from said multiple scattering component.

8. The method as claimed in claim 7, in which, during the processing step (c), an image of the medium is formed and the reliability of said image is quantified as a function of said reliability index.

9. The method as claimed in claim 8, in which, during the processing step (c), said reliability index is calculated at several points and the reliability of several parts of the image corresponding to said several points is quantified as a function of said reliability index.

10. The method as claimed in claim 1, in which, during the filtering substep (c3), a single scattering component $ks_{ij}(T,f)$ is extracted from each coefficient $k_{ij}(T,f)$ of the matrix $K(T,f)$, such that the single scattering components $ks_{ij}(T,f)$ are mutually coherent along each antidiagonal of said matrix $K(T,f)$.

11. The method as claimed in claim 1, in which, during the filtering substep (c3), a multiple scattering component kMij(T,f) is extracted from each coefficient kij(T,f) of the matrix K(T,f).

12. The method as claimed in claim 1, in which the transducer array comprises at least a number N of transducers and the windowed frequency transfer matrix K(T,f) is an N×N matrix.

13. The method as claimed in claim 1, in which, during the windowed transfer matrix determination substep (c1), several windowed transfer matrices K(T,f) are determined for several values of T and the procedure passes to the filtering substep (c3) for each of the windowed transfer matrices K(T,f).

14. The method as claimed in claim 13, in which the temporal windows of the various windowed transfer matrices K(T,f) are contiguous.

15. The method as claimed in claim 1, in which, during the windowed transfer matrix determination substep (e1), each windowed frequency matrix K(T,f) is determined by the Fourier transform of a windowed temporal matrix K(T,t) corresponding, over said neighboring temporal window of time T and duration Δt, to the temporal responses hij(t) between transducers of the transducer array.

16. The method as claimed in claim 1, in which:
the processing step (c) using the CPU further includes a data rotation substep (c2) which is intermediate between the windowed transfer matrix determination substep (c1) and the filtering substep (c3) and during which two matrices A1(T,f)=[a1uv(T,f)] and A2=[a2uv(T,f)] are calculated from K(T,f), in which:
a1uv(T,f)=ku+v−1,v−u+2M−1(T,f),
a2uv(T,f)=ku+v,v−u+2M−1(T,f),
M=(N+3)/4,
N is a smaller dimension of the transfer matrix K(T,f) and is chosen so that M is an integer;
during the filtering substep (c3), the multiple scattering component is separated from the single scattering component in each of the matrices Ar, r being an index equal to 1 or 2, and at least two filtered matrices ArF are thus obtained which correspond, respectively, to the matrices Ar and each being representative either of the single scattering component or of the multiple scattering component; and
the processing step (c) furthermore includes an inverse data rotation substep (c4) which is after the filtering substep (c3) and during which a filtered windowed transfer matrix KF(T,f)=[kFij(T,f)] is calculated, where:
when i−j is even: kFij(T,f)=a1F(i−j)/2+M,(i+j)/2,
when i−j is odd: kFij(T,f)=a2F(i−j−1)/2+M,(i+j−1)/2.

17. The method as claimed in claim 16, in which, during the filtering substep (c3), the two matrices ArF are calculated by the formula: ArF=StS*Ar, in which:
S=[su] is a column vector, tS* being the transpose of the conjugate vector of the vector S;
the components su of the vector S are complex numbers equal to:

$$s_u = \exp\left\{j\frac{k}{2R}y_u^2\right\}/\sqrt{L};$$

k is the wavenumber;
R=c·T/2;
yu=(xi−xj)/√2, with u=(i−j)/2+M if r=1 and u(i−j−1)/2+M if r=2;

xi and xj are the abscissae of the transducers of indices i and j along an axis X, the transducer array extending at least along said axis XS; and
L=2M−1 for r=1 and L=2M−2 for r=2,
said matrices ArF being representative of the single scattering component.

18. The method as claimed in claim 16, in which, during the filtering substep (c3):
each of the matrices Ar is decomposed into singular values, thus determining M singular values $\lambda_{i,r}$ for each of the matrices Ar, i being an index between 1 and M and the singular values being ordered in decreasing order for increasing i; and
for each matrix Ar, the most important p singular values $\lambda_{1,r}$ to $\lambda_{p,r}$, p being between 1 and M, are assigned to the single scattering and the other possible non-zero singular values are assigned to the multiple scattering.

19. The method as claimed in claim 18, in which the p singular values assigned to the single scattering are determined iteratively as follows:
(c31) q is initially set to 1;
(c32) a normalized singular value is calculated from $$\lambda_{q,r} : \tilde{\lambda}_{q,r} = \frac{\lambda_{q,r}}{\sqrt{\frac{1}{Mr+1-q}\sum_{m=q}^{Mr}\tilde{\lambda}_{m,r}^2}},$$

with Mr=M if r=1 and Mr=M−1 if r=2;
(c33) if $\tilde{\lambda}_{q,r}$ is at least equal to a predetermined threshold value $\tilde{\lambda}_{max}$, $\tilde{\lambda}_{q,r}$ is assigned to the single scattering and substep (c32) is repeated, q being incremented by unity; and
(c34) if $\tilde{\lambda}_{q,r}$ is below the threshold value $\tilde{\lambda}_{max}$, then $\tilde{\lambda}_{q,r}$ and the possible following singular values are assigned to the multiple scattering.

20. The method as claimed in claim 1, in which said waves are chosen from mechanical waves and electromagnetic waves.

21. A device for implementing a probe method as claimed in claim 1, compromising an array of transducers designed to transmit an incident wave into a scattering medium and to capture signals representative of a reflected wave reverberated by the medium by the medium on the basis of the incident wave, said captured signals comprising"
a single scattering component representative of wave paths in which the reflected wave results from a single reflection of the incident wave by each scatterer in the medium; and
as the case may be, a multiple scattering component representative of wave paths in which the reflected wave results from several successive reflections of the incident wave by the scatterers in the medium before reaching the transducer array, said device furthermore including processing means designed to process said captured signals for the purpose of determining characteristics of the medium,
wherein the processing means are designed to extract at least one component chosen from the multiple scattering component and the single scattering component, by filtering at least one frequency transfer matrix representative of the responses between transducers of the transducer array,
the processing means (5) being adapted for:
determining a windowed transfer matrix, by determining at least one windowed frequency transfer matrix K(T,f)=

[$k_{ij}(T,f)$], corresponding to a windowed temporal inter-element response matrix $K(T,t)=[k_{ij}(T,t)]$, is determined, said windowed temporal inter-element response matrix corresponding, over a neighboring temporal window of time T and duration $\Delta t$, to the temporal responses $h_{ij}(t)$ between transducers of the transducer array, f being the frequency;

separating by filtering, the multiple scattering component from the single scattering component in each windowed frequency transfer matrix $K(T,f)$ as a function of the coherence of the coefficients $k_{ij}(T,f)$ of the windowed frequency transfer matrix $K(T,f)$ along each antidiagonal of said windowed frequency transfer matrix $K(T,f)$.

\* \* \* \* \*